US006483730B2

(12) United States Patent
Johnson, Jr.

(10) Patent No.: US 6,483,730 B2
(45) Date of Patent: Nov. 19, 2002

(54) POWER CONVERTERS WITH AC AND DC OPERATING MODES AND METHODS OF OPERATION THEREOF

(75) Inventor: Robert W. Johnson, Jr., Raleigh, NC (US)

(73) Assignee: Powerware Corporation, Research Triangle Park, NC (US)

( * ) Notice: Subject to any disclaimer, the term of this patent is extended or adjusted under 35 U.S.C. 154(b) by 0 days.

(21) Appl. No.: 09/887,687

(22) Filed: Dec. 10, 2001

(65) Prior Publication Data

US 2002/0118556 A1 Aug. 29, 2002

Related U.S. Application Data

(63) Continuation of application No. 09/515,138, filed on Feb. 29, 2000, now abandoned, which is a continuation-in-part of application No. 09/374,180, filed on Aug. 13, 1999, now abandoned.

(51) Int. Cl.⁷ .......................... H02M 5/458; H02M 5/45
(52) U.S. Cl. ......................... 363/123; 363/142; 363/58; 363/37; 307/66
(58) Field of Search ............................. 363/17, 34, 37, 363/58, 98, 132, 123, 142; 307/66

(56) References Cited

U.S. PATENT DOCUMENTS 4,502,106 A * 2/1985 Glennon ..................... 363/132

(List continued on next page.)

FOREIGN PATENT DOCUMENTS

| EP | 0 420 628 A2 | 4/1991 |
| EP | 1005 132 A2 | 5/2000 |
| JP | 05260610 | 10/1993 |
| JP | 07046861 | 2/1995 |
| JP | 10066351 | 3/1998 |
| WO | WO 94/23482 | 10/1994 |

OTHER PUBLICATIONS

Rooij et al., "A Novel Unity Power Factor Low EMI Uninterruptible Power Supply," IEEE, 1996, pp. 1278–1283.
International Search Report, PCT/US00/20593, Dec. 29, 2000.
International Search Report, PCT/US01/05594, Nov. 19, 2001.

Primary Examiner—Bao Q. Vu
(74) Attorney, Agent, or Firm—Myers Bigel Sibley & Sajovec

(57) ABSTRACT

A power converter suitable for use in an uninterruptible power supply (UPS) includes first and second voltage busses, an input port having a first terminal coupled to one of the first and second voltage busses, a neutral bus and an output terminal. A first switching circuit selectively couples a second terminal of the input port to the first and second voltage busses. A second switching circuit selectively couples the first and second voltage busses to the output terminal. A third switching circuit selectively couples the first and second voltage busses to the neutral bus. Preferably, the first, second and third switching circuits are operative to produce an AC output voltage at the output terminal from a DC input voltage at the input port such that alternating ones of the first and second terminals of the first input port are referenced to the neutral bus for successive first and second half cycles of the AC output voltage. According to other embodiments, a DC voltage generating circuit is operative to produce respective first and second DC voltages on first and second voltage busses. A first switching circuit is operative to selectively couple the first and second voltage busses to the output terminal. A storage circuit connected to the output terminal includes a capacitive storage element, a rectifying circuit coupling the capacitive storage element to the output terminal, and a second switching circuit operative to selectively couple the capacitive storage element to the output terminal.

37 Claims, 15 Drawing Sheets

U.S. PATENT DOCUMENTS

| | | | | |
|---|---|---|---|---|
| 4,507,724 A | * | 3/1985 | Glennon | 363/132 |
| 4,894,765 A | | 1/1990 | Kahkipuro | 363/124 |
| 5,111,374 A | | 5/1992 | Lai et al. | 363/37 |
| 5,111,376 A | | 5/1992 | Mehl | 363/71 |
| 5,119,283 A | | 6/1992 | Steigerwald et al. | 363/27 |
| 5,126,585 A | | 6/1992 | Boys | 307/66 |
| 5,229,650 A | | 7/1993 | Kita et al. | 307/66 |
| 5,237,208 A | | 8/1993 | Tominaga et al. | 307/66 |
| 5,253,157 A | | 10/1993 | Severinsky | 363/98 |
| 5,343,079 A | | 8/1994 | Mohan et al. | 307/105 |
| 5,463,283 A | | 10/1995 | Sanderson | 315/209 R |
| 5,502,630 A | | 3/1996 | Rokhvarg | 363/84 |
| 5,592,369 A | * | 1/1997 | Bjorklund | 363/35 |
| 5,610,805 A | | 3/1997 | Gupta | 363/37 |
| 5,644,483 A | | 7/1997 | Peng et al. | 363/37 |
| 5,710,696 A | * | 1/1998 | Reynolds et al. | 363/132 |
| 5,781,422 A | | 7/1998 | Lavin et al. | 363/37 |
| 5,824,990 A | * | 10/1998 | Geissler et al. | 219/130.21 |
| 5,901,056 A | * | 5/1999 | Hung | 307/64 |
| 5,978,236 A | | 11/1999 | Faberman et al. | 363/37 |
| 5,982,652 A | * | 11/1999 | Simonelli et al. | 307/26 |
| 6,005,362 A | | 12/1999 | Enjeti et al. | 318/479 |
| 6,014,322 A | * | 1/2000 | Higashi et al. | 363/65 |

* cited by examiner

POWER CONVERTERS WITH AC AND DC OPERATING MODES AND METHODS OF OPERATION THEREOF

RELATED APPLICATIONS

This application is a continuation of United States Patent Application No. 09/515,138, filed Feb. 29, 2000 now abandoned, which is a continuation-in-part of U.S. patent application Ser. No. 09/374,180 to Johnson et al., filed Aug. 13, 1999, now abandoned, the disclosures of which are herein incorporated by reference in their entirety.

FIELD OF THE INVENTION

The present invention relates to electrical power devices and methods of operation thereof, and more particularly, to power conversion devices and methods of operation thereof.

BACKGROUND OF THE INVENTION

Uninterruptible power supplies (UPSs) are power conversion devices that are commonly used to provide conditioned, reliable power for computer networks, telecommunications networks, medical equipment and the like. UPSs are widely used with computers and similar computing devices, including but not limited to personal computers, workstations, mini computers, network servers, disk arrays and mainframe computers, to insure that valuable data is not lost and that the device can continue to operate notwithstanding temporary loss of an AC utility source. UPSs typically provide power to such electronic equipment from a secondary source, such as a battery, in the event that a primary alternating current (AC) utility source drops out (blackout) or fails to provide a proper voltage (brownout).

Conventional UPSs may be classified into categories. Referring to FIG. 1, a typical conventional off-line UPS disconnects a load from a primary AC source 10 when the primary AC source fails or is operating in a degraded manner, allowing the load to be served from a secondary source such as a battery. The AC power source 10 is connected in series with a switch SI, producing an AC voltage across a load 20 when the switch $S_1$ is closed. Energy storage is typically provided in the form of a storage capacitor $C_S$. The secondary power source, here a battery B, is connected to the load 20 via a low voltage converter 30 and a transformer T. When the AC power source 10 fails, the switch SI is opened, causing the load to draw power from the battery B. The low voltage converter 30 typically is an inverter that produces a quasi-square wave or sine wave voltage on a first winding $L_1$ of the transformer T from a DC voltage produced by the battery B. The first winding $L_1$ is coupled to a second winding $L_2$ of the transformer T connected across the load 20. When the AC power source is operational, i.e., when the switch $S_1$ is closed, the battery B may be charged using the low-voltage converter 30 or a separate battery charger circuit (not shown).

A line interactive (LIA) UPS topology is illustrated in FIG. 2. Here, the transformer T has a third winding $L_3$ that may be connected in series with the load 20 using switches $S_2$, $S_3$ to "buck" or "boost" the voltage applied to the load 20. As with the offline UPS topology of FIG. 1, when the AC power source 10 fails, the switch $S_1$ can be opened to allow the load 20 to run off the battery B.

As illustrated in FIG. 3, a typical on-line UPS includes a rectifier 40 that receives an AC voltage from an AC power source 10, producing a DC voltage across a storage capacitor $C_S$ at an intermediate node 45. An inverter 50 is connected between the intermediate node 45, and is operative to produce an AC voltage across a load 20 from the DC voltage. As shown, a battery B is connected to the intermediate node 45 via a DC/DC converter 60, supplying auxiliary power. Alternatively, the DC/DC converter can be eliminated and a high-voltage battery (not shown) connected directly to the intermediate node 45.

Each of these topologies may have disadvantages. For example, typical conventional on-line and LIA UPSs for 60 Hz applications use 60 Hz magnetic components (e.g., transformers and inductors) that are sized for such frequencies, and thus may be large, heavy and expensive. LIA UPSs often exhibit step voltage changes that can affect the performance of the load. Conventional off-line, LIA and on-line UPSs often use large storage capacitors, which tend to be bulky and expensive, in order to maintain an acceptable output voltage under heavy loading conditions. Moreover, because conventional UPSs are typically designed to operate in only one of the above-described off-line, LIA or on-line modes, sellers of UPSs may be required to maintain large inventories including several different types of UPSs in order to meet a variety of different customer applications.

SUMMARY OF THE INVENTION

According to embodiments of the present invention, a power converter, such as one that might be utilized in an uninterruptible power supply (UPS), includes first and second voltage busses, a first input port having a first terminal coupled to one of the first and second voltage busses, a neutral bus and an output terminal. A first switching circuit selectively couples a second terminal of the first input port to the first and second voltage busses. A second switching circuit selectively couples the first and second voltage busses to the output terminal. A third switching circuit selectively couples the first and second voltage busses to the neutral bus. Preferably, the first, second and third switching circuits are operative to produce an AC output voltage at the output terminal from a DC input voltage at the first input port such that alternating ones of the first and second terminals of the first input port are referenced to the neutral bus for successive first and second half cycles of the AC output voltage.

In embodiments of the present invention, the first switching circuit includes a first inductance having first and second terminals, the first terminal of the first inductance coupled to the second terminal of the first input port. The first switching circuit further includes a first switch is operative to couple and decouple the second terminal of the first inductance and the first voltage bus and a second switch operative to couple and decouple the second terminal of the first inductance and the second voltage bus. The second switching circuit includes a second inductance having first and second terminals, the first terminal of the second inductance coupled to the output terminal. The second switching circuit further includes a third switch operative to couple and decouple the second terminal of the second inductance and the first voltage bus and a fourth switch operative to couple and decouple the second terminal of the second inductance and the second voltage bus. The third switching circuit includes a third inductance having first and second terminals, the first terminal of the third inductance connected to the neutral bus. The third switching circuit also includes a fifth switch operative to couple and decouple the second terminal of the third inductance and the first voltage bus and sixth switch operative to couple and decouple the second terminal of the third inductance and the second voltage bus.

In other embodiments of the present invention, a power converter further includes a second input port. A fourth switching circuit concurrently couples the second terminal of the first input port to the second voltage bus, decouples the second terminal of the first input port from the first switching circuit, and couples the first switching circuit to a first terminal of the second input port, in a first mode. The fourth switching circuit concurrently couples the second terminal of the first input port to the first switching circuit, decouples the second terminal of the first input port from the second voltage bus, and decouples the first terminal of the second input port from the first switching circuit, in a second mode.

According to other aspects of the present invention, a power converter includes first and second voltage busses, a neutral bus, and an output terminal. A DC voltage generating circuit is operative to produce respective first and second DC voltages on the first and second voltage busses. A first switching circuit is operative to selectively couple the first and second voltage busses to the output terminal. A storage circuit is connected to the output terminal, and includes a capacitive storage element, a rectifying circuit coupling the capacitive storage element to the output terminal and operative to produce a DC voltage across the capacitive storage element from an AC output voltage at the output terminal, and a second switching circuit operative to selectively couple the capacitive storage element to the output terminal.

In embodiments of the present invention, the first switching circuit includes a first inductor having first and second terminals. The first terminal of the first inductor is coupled to the output terminal and respective first and second switches are operative to selectively couple the second terminal of the inductor to the first and second voltage busses. The storage circuit is electrically coupled to the output terminal through a second inductor that is inductively coupled to the first inductor.

According to still other embodiments of the present invention, the storage circuit includes first and second storage busses. The capacitive storage element includes respective first and second capacitors coupling respective ones of the first and second storage busses to the neutral bus. The second switching circuit includes a third switch operative to couple and decouple the first storage bus and the output terminal and a fourth switch operative to couple and decouple the second storage bus and the output terminal. According to an aspect of the present invention, the first and third switches open and close in synchronism, and the second and fourth switches open and close in synchronism.

According to other aspects of the present invention, the DC voltage generating circuit includes a rectifying circuit configured to connect to an AC power source at an AC input port and operative to produce the first and second DC voltages on the first and second voltage busses from an AC input voltage applied to the DC voltage generating circuit. The rectifying circuit, the first switching circuit and the second switching circuit are operative to produce the AC output voltage at the output terminal while maintaining a substantially unity power factor at the AC input port.

According to method aspects of the present invention, an AC output voltage is generated at a load from a DC input voltage produced by a DC power source by coupling a first terminal of the DC power source to one of a first voltage bus and a second voltage bus. A second terminal of the DC power source is selectively coupled to the first voltage bus and a second voltage bus through respective first and second switches. A first terminal of a load is coupled to a neutral bus. The first and second voltage busses are selectively coupled to a second terminal of the load through respective third and fourth switches. The first and second voltage busses are selectively coupled to the neutral bus through respective fifth and sixth switches. Preferably, the first and second terminals of the DC power source are alternatingly referenced to the neutral bus for successive first and second half cycles of the AC output voltage.

According to other method aspects of the present invention, an AC output voltage is produced at a load by generating respective first and second DC voltages on the first and second voltage busses. The first and second voltage busses are selectively coupled to the load through respective first and second switches to generate an AC output voltage at the load. First and second capacitors are rectifyingly coupled to the load to produce respective first and second DC voltages across respective ones of the first and second capacitors from an AC output voltage at the load. The first and second capacitors are selectively coupled to the load through respective third and fourth switches to transfer power between the first and second capacitors and the load.

DETAILED DESCRIPTION OF PREFERRED EMBODIMENTS

Figure 1:
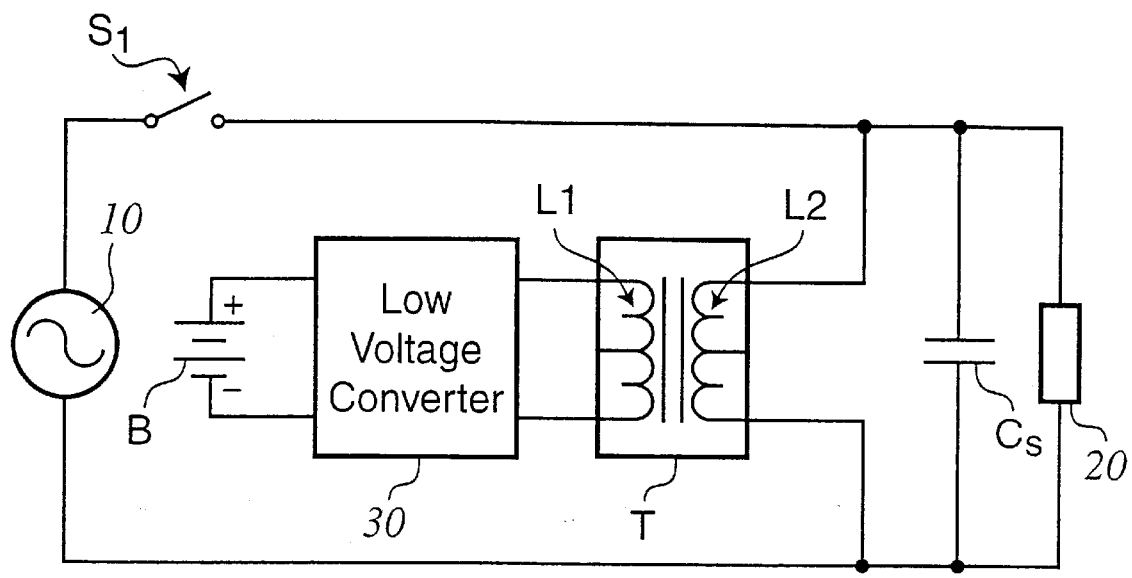
FIGS. 1–3 are schematic diagrams of power conversion circuit topologies used in typical conventional uninterruptible power supplies (UPSs).
Figure 2:
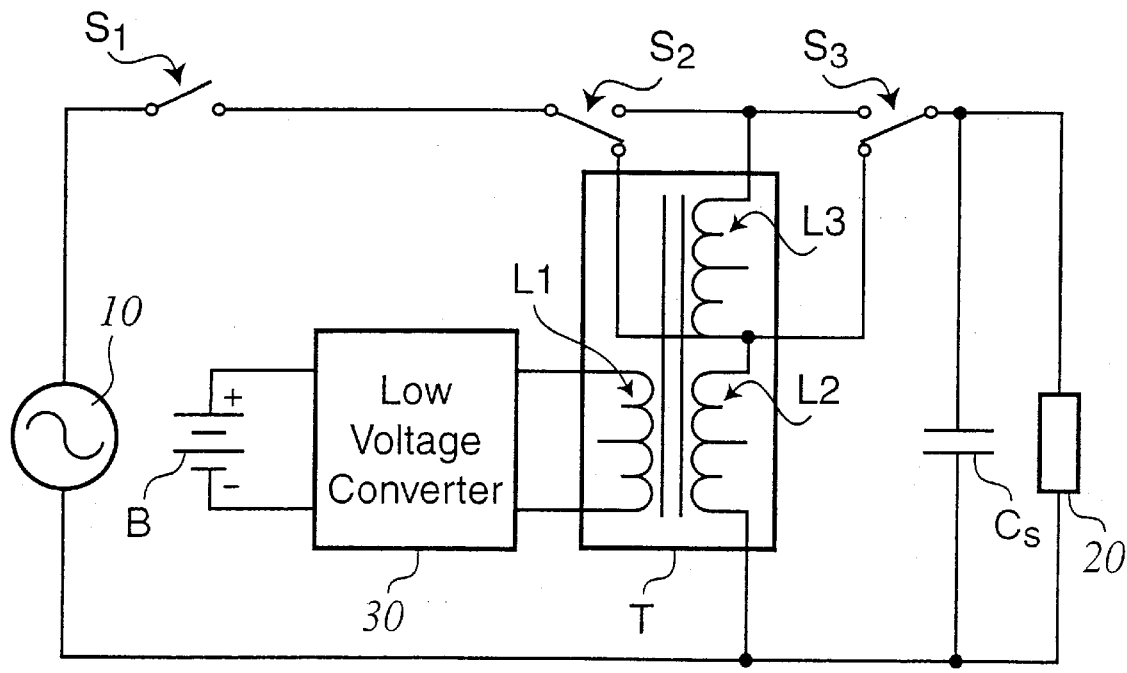
Figure 3:
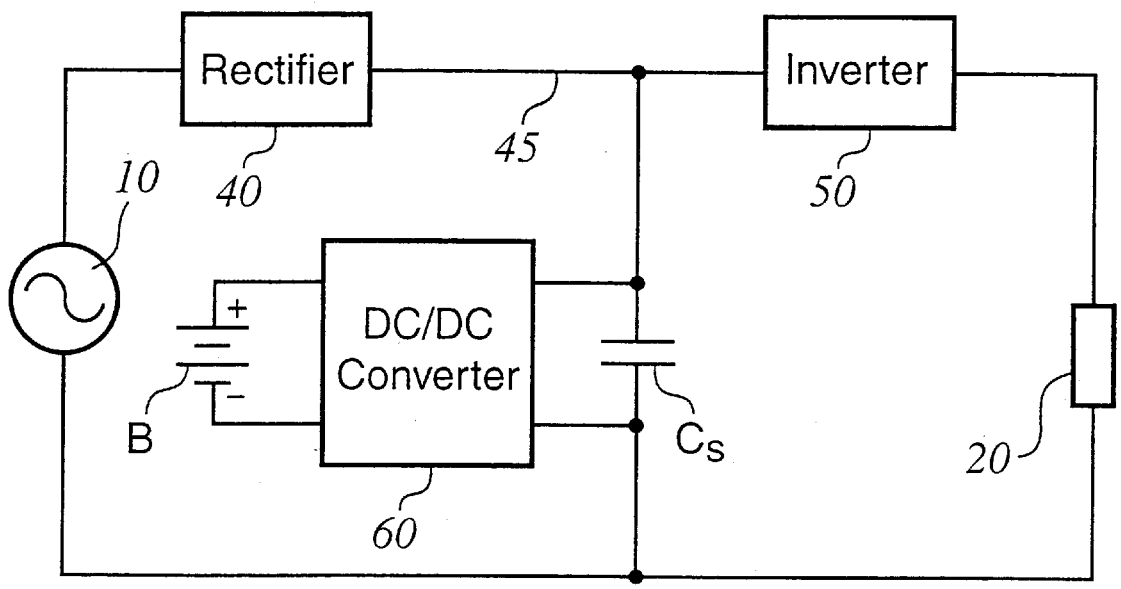

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Figure 4:
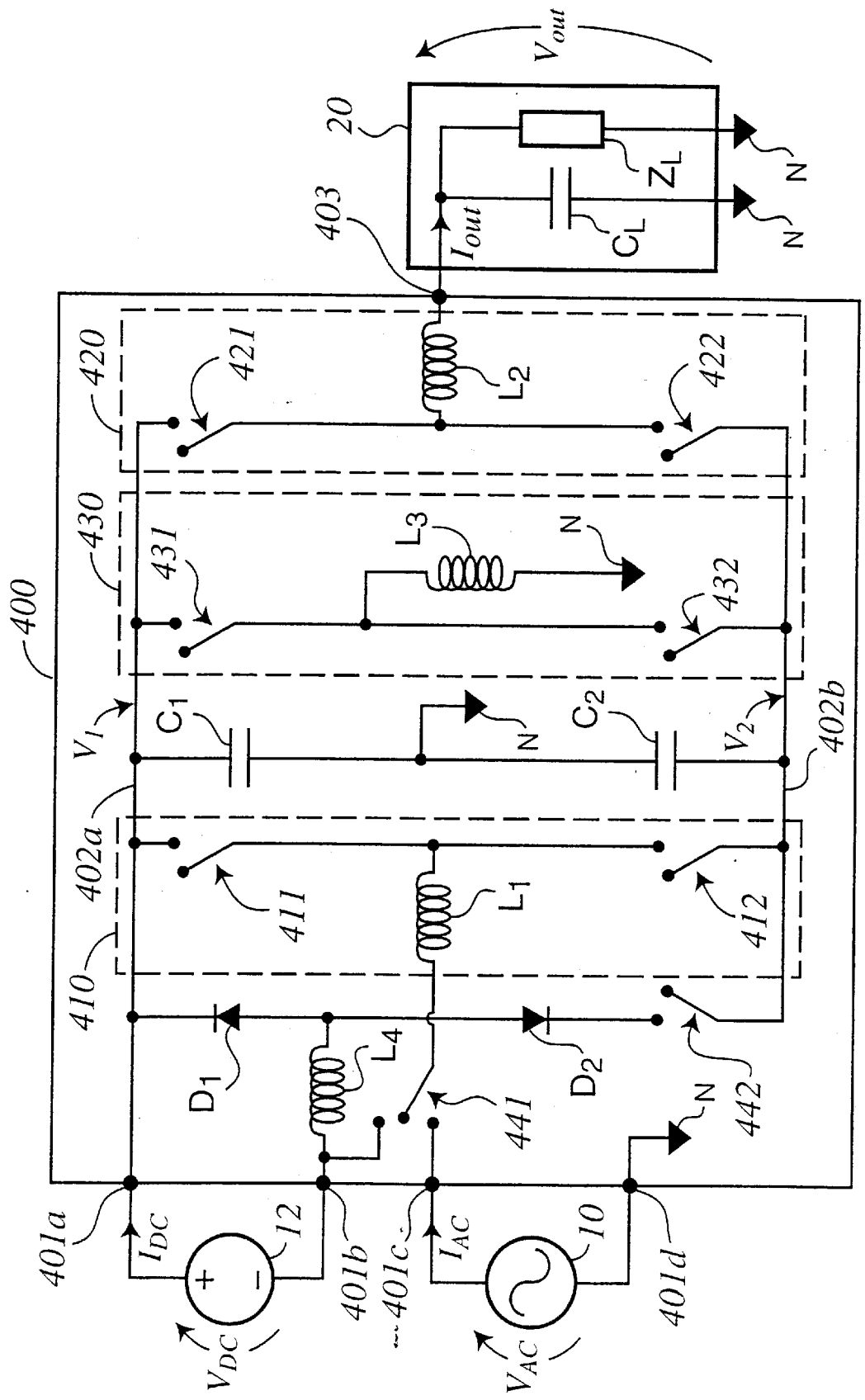
FIGS. 4–5 are schematic diagrams illustrating power converters according to embodiments of the present invention.

FIG. 4 is a schematic diagram illustrating a power converter 400 according to embodiments of the present invention, in particular, a power converter configured to operate as an uninterruptible power supply (UPS). The power converter 400 includes a first switching circuit 410, a second switching circuit 420, and a third switching circuit 430, each of which is coupled to first and second voltage busses 402a, 402b.

First and second capacitors $C_1$, $C_2$ are coupled to the first and second voltage busses 402a, 402b to the neutral bus N, and provide energy storage. The first voltage bus 402a is configured to connect to a DC power supply 12 at a first terminal 401a of a first input port. The first switching circuit 410 includes first and second switches 411, 412 that selectively couple the DC power source 12 to the first and second power busses 402a, 402b via a second terminal 401b of the first input port and a first inductor $L_1$, here shown as switchably connected to the second terminal 401b of the first input port by a switch 441. The second switching circuit 420 includes third and fourth switches 421, 422 that selectively couple the first and second voltage busses 402a, 402b, respectively, to a load 20 at an output terminal 403 through a second inductor $L_2$. The third switching circuit 430 includes fifth and sixth switches 431, 432 that selectively couple the first and second voltage busses 402a, 402b, respectively, to the neutral bus N through a third inductor $L_3$. Preferably, the switches of the switch pairs 411–412, 421–422, 431–432 of the first switching, second switching and third switching circuits 410, 420, 430 operate in a substantially complementary fashion.

The power converter 400 also includes first and second terminals 401c, 401d of a second input port that that is configured to connect to an AC power source 10. The power converter 400 of the illustrated embodiment further includes a seventh switch 441 that switches the first inductor $L_1$ between the DC power source 12 and the AC power source 10. For the illustrated embodiment, the first voltage bus 402a is configured to connect to the DC power source 12 at a first terminal thereof. As shown, the seventh switch 441 couples and decouples the AC power source 10 and a second terminal of the DC power source 12 to and from the first inductor $L_1$ in a complementary fashion. Consequently, when the seventh switch 441 couples the AC source 10 to the inductor $L_1$, the power converter 400 operates in an AC-powered (e.g., "normal") mode and, when the seventh switch 441 couples the DC source 12 to the inductor $L_1$, the power converter 400 operates in a DC-powered (e.g., "emergency") mode. In the illustrated embodiment, the power converter 400 also includes an eighth switch 442 that is operative to couple and decouple the DC power source 12 and the second voltage bus 402b through a fourth inductor $L_4$. The eighth switch 442 can be used to implement operations for charging the DC power source 12 (e.g., when the DC power source 12 is a battery), as described in further detail below.

In the AC-powered mode, the first switching circuit 410 can be operated as a rectifier, producing first and second DC voltages $V_1$, $V_2$ on respective ones of the first and second voltage busses 402a, 402b from an AC input voltage $V_{AC}$. As described in the aforementioned U.S. patent application Ser. No. 09/374,180, the first switching circuit 410 can boost the DC voltages $V_1$, $V_2$ by controlling the modulation of the switches 411, 412. The second switching circuit 420 can be operated as an inverter, inverting the DC voltages $V_1$, $V_2$ to produce an AC output voltage $V_{out}$ at the load. Through low pass filtering effected by the second inductor $L_2$ and the load capacitance $C_L$, the AC output voltage $V_{out}$ may be smoothed to produce an approximately sinusoidal waveform. The third switching circuit 430 can be operated as a "balancer," controlling the relative magnitudes of the first and second DC voltages $V_1$, $V_2$ on the first and second voltage busses 402a, 402b by controlling respective first and second rates (e.g., duty cycles) at which the neutral bus N is connected to respective ones of the first and second voltage busses 402a, 402b through the third inductor $L_3$.

As used herein, a "balancer circuit" is a circuit that is capable of effecting a desired "balance" between voltages on different busses, such as the first and second voltage busses 402a, 402b of FIG. 4. This capability can allow power converters according to embodiments of the present invention, among other things, to control DC current drawn from the AC power source 10, to operate more efficiently, and/or to utilize smaller components, e.g., storage capacitors, than those used in many conventional devices.

In the DC-powered mode, the first switching, second switching and third switching circuits 410, 420, 430 can be operated in a different manner to produce the AC output voltage $V_{out}$ from a DC output voltage $V_{DC}$ produced by the DC power source 12. According to an aspect of the present invention, the combination of the first, second and third switching circuits 410, 420, 430 can be controlled such that reference for the terminal DC power source 12 connected at the input terminal 401b is moved between the neutral bus N and the second voltage bus 402b as the AC output voltage $V_{out}$ transitions between positive and negative half cycles during DC-powered operation. This can allow for the use of lower voltage-rated parts for the switching elements of the first, second and third switching circuits 410, 420, 430.

Figure 5:
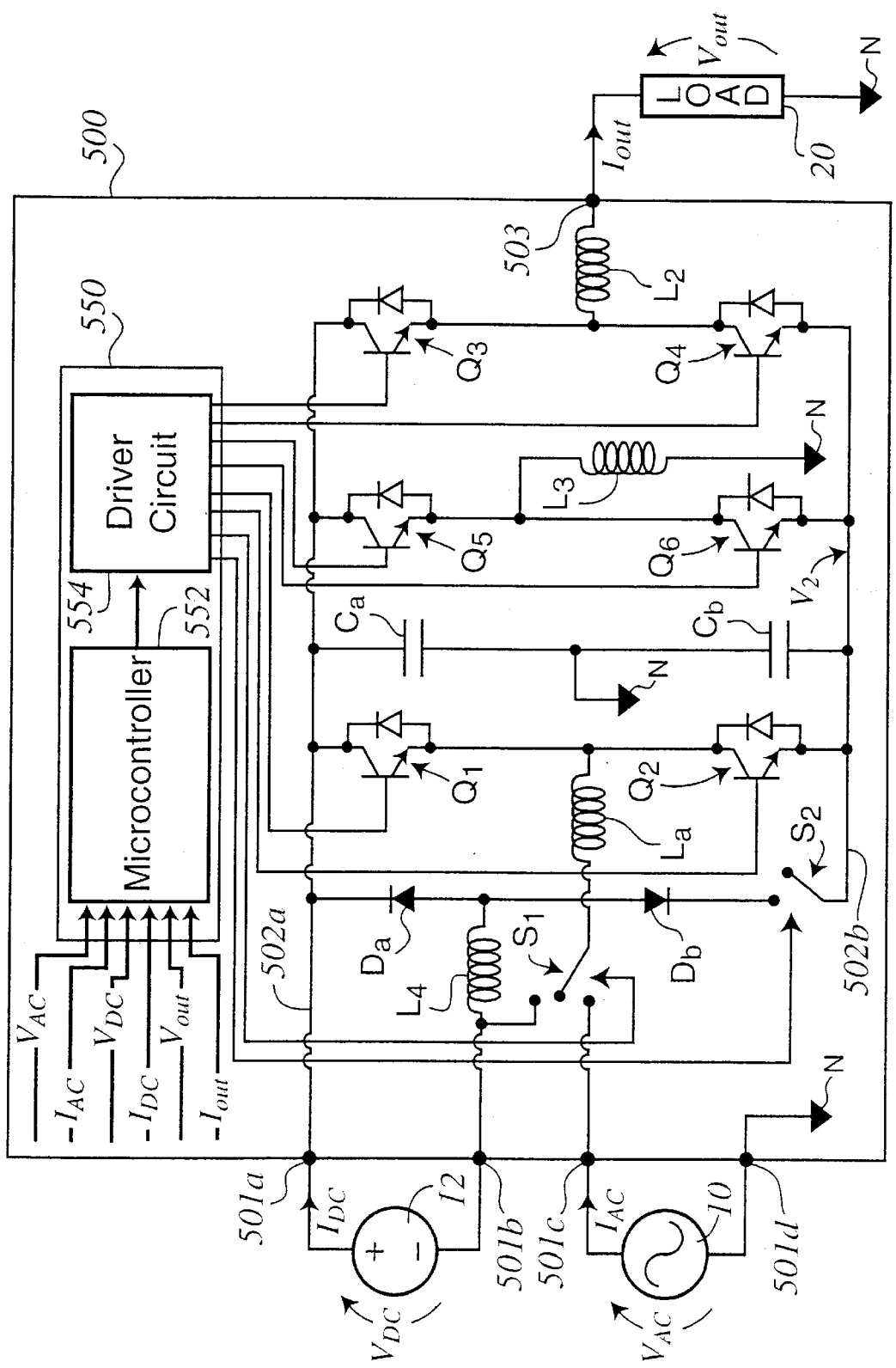

FIG. 5 illustrates a circuit implementation of a power converter 500 according to other embodiments of the present invention. The converter 500 includes a first, DC input port including first and second terminal 501a, 501b configured to connect to a DC power source 12, and a second, AC input port including first and second terminals 501c, 501d configured to connect to an AC power source. A first switch SI (e.g., a relay) is operative to switch a first inductor $L_a$ between terminals 501b, 501c under control of a switch control circuit 550 that includes a microcontroller 552 and a driver circuit 554. Respective first and second capacitors $C_a$, $C_b$ couple respective ones of the first and second voltage busses 502a, 502b to a neutral bus N. Diode protected transistor switches $Q_1$, Q2 selectively couple the first inductor La to the first and second voltage busses 502a, 502b, also under control of the switch control circuit 550. Diode-protected transistors Q3, $Q_4$ selectively couple an output terminal 503 to the first and second voltage busses 502a, 502b through a second inductor $L_b$ under control of the switch control circuit 550. Fifth and sixth diode-protected transistors $Q_5$, $Q_6$ selectively couple the first and second voltage busses 502a, 502b to the neutral bus N through a third inductor $L_3$, also under control of the switch control circuit 550. A second switch $S_2$ (e.g., an insulated gate bipolar transistor (IGBT), field effect transistor (FET) or other switching device) is operative to couple and decouple the second voltage bus 502b and the input terminal 501b at which the DC power source 12 is connected. Diodes $D_a$, $D_b$ provide current direction control between first and second voltage busses 502a, 502b and the input terminal 501b.

The switch control circuit 540 may control the transistors $Q_1$, $Q_2$, $Q_3$, $Q_4$, $Q_5$, $Q_6$ and the switches $S_1$, $S_2$ responsive to several operational variables including, but not limited to, the AC input voltage $V_{AC}$ at the terminals 501c, $501_d$ of the AC input port, the DC input voltage $V_{DC}$ at the terminals 501a, 501b of the DC input port, the AC output voltage $V_{out}$ at the output terminal 503, the AC current $I_{AC}$ at the input terminals 501c, $501_d$ of the AC input port, the DC current $I_{DC}$ at the input terminals 501a, 501b of the DC input port, and the AC current $I_{OUT}$ at the output terminal 503. The switch control circuit 550 may operate using different types of control techniques including, but not limited to, "open loop" control techniques in which the operations of the transistors $Q_1$, $Q_2$, $Q_3$, $Q_4$, $Q_5$, $Q_6$ are controlled based on the AC input voltage $V_{AC}$, without reference to the output voltage $V_{out}$ produced by the converter 550. The switch control circuit 550 may also operate using "closed loop" techniques in which the AC output voltage $V_{out}$ is sensed and used to guide control of the operations of the transistors $Q_1$, $Q_2$, $Q_3$, $Q_4$, $Q_5$, $Q_6$. The AC input voltage $V_{AC}$, the DC input voltage $V_{DC}$, the AC output voltage $V_{out}$, the AC current $I_{AC}$, the DC current $I_{DC}$, the AC current $I_{out}$ and other operational variables may be provided to the switch control circuit 550 in a number of different forms including, but not limited to, analog or digital representations of these voltages and currents or quantities related to and/or derived from these voltages and currents.

It will be appreciated that the embodiment of FIG. 5 represents an exemplary implementation, and that other circuit implementations fall within the scope of the present invention. For example, the switching functions of the transistors $Q_1$, $Q_2$, $Q_3$, $Q_4$, $Q_5$, $Q_6$ may be provided by a variety of switching devices including, but not limited to, bipolar transistors, field-effect transistors (FETs), metal oxide semiconductor FETs (MOSFETs), gate turn-on devices (GTOs), and the like. The driver circuit 554 may include variety of different components as well, and preferably includes components suitable for controlling the particular type(s) of switching devices used.

Other functions of the switching control circuit 550 may be implemented in a number of different ways within the scope of the present invention. For example, functions of the microcontroller 552 may be implemented using discrete logic circuits or programmable logic circuits such as programmable logic devices (PLDs) instead or in conjunction with a microcontroller, microprocessor or similar device. Functions of the microcontroller 552 and the driver circuit 554 may also be combined in one or more devices, such as an application-specific integrated circuit (ASIC) or a hybrid microcircuit.

It will be appreciated that configurations that are complementary or "mirror images" with respect to the configurations of the embodiments of FIGS. 4 and 5 and also fall within the scope of the present invention. For example, rather than fixedly connecting the positive terminal of the DC power source 12 to the first voltage bus 402a and switchably connecting the negative terminal of the DC power source 12 to the first switching circuit 410 as shown in FIG. 4, the negative terminal of the DC power source 12 can be fixedly connected to the second voltage bus 402b and the positive terminal of the DC power source 12 switchably connected to the first switching circuit 410.

The following discussion describes various operational modes of power converters according to embodiments of the present invention. In particular, operation of a power converter, such as the power converters 400, 500 of FIGS. 4 and 5, will be described in terms of the operation of switching elements, such as the switches 411, 412, 421, 422, 431, 432 of the first switching, second switching and third switching circuits 410, 420, 430 of the power converter 400. More particularly, operations of power converters will be described in terms of "duty cycles" at which the switching elements are switched (modulated).

As used herein, "duty cycle" generally refers to a percentage of time during a switching cycle period (corresponding to the switching frequency described above) that a switch is in a "closed," i.e., conductive, state. Thus, for example, a switch that is maintained at a 50% duty cycle is intermittently "on" for half of a switching cycle, while a switch approaching a 100% duty cycle, e.g., a 99% duty cycle, is on for nearly all of the switching cycle. It will be understood that, as described herein, the switches discussed may also operate at a 100% duty cycle, i.e., be maintained in an "on" state throughout one or more switching cycles, or at a 0% duty cycle, i.e., be maintained in an "off" state throughout one or more switching cycles.

It will be appreciated that this duty cycle control may be achieved, for example, by application of appropriate control signals to appropriate switching components. For example, referring to the embodiment of FIG. 5, duty cycle control of the switching transistors $Q_1$, $Q_2$, $Q_3$, $Q_4$, $Q_5$, $Q_6$ may be achieved by the microcontroller 552 and driver circuit 554 applying appropriate base drive signals to the switching transistors $Q_1$, $Q_2$, $Q_3$, $Q_4$, $Q_5$, $Q_6$. It will be understood, however, that such duty cycle control may be achieved using any of a number of other switching devices and control signal generating circuits.

Preferably, each of the first, second, third, fourth, fifth and sixth switches 411, 412, 421, 422, 431, 432 of FIGS. 4 and 6–11, 14 and 16 (and corresponding switching elements of FIG. 5) are operated at one or more switching frequencies that are relatively high with respect to the frequency of the AC output voltage $V_{out}$ produced by the converter, and more preferably, at one or more switching frequencies that each are at least 10 times higher than the frequency of the AC output voltage $V_{out}$. Using relatively high switching frequencies allows the magnetic components (e.g., the inductors $L_1$, $L_2$, $L_3$) to be relatively small in size. It will be appreciated that although different switching frequencies can be used among the switches 411, 412, 421, 422, 431, 432, a common switching frequency also may be used.

Preferably, each of the switch pairs comprising first and second switches 411, 412, the third and fourth switches 421, 422, and the fifth and sixth switches 431, 432, (and corresponding switching transistor pairs in the embodiment of FIG. 5) are operated in a complementary fashion. Thus, for example, the second switch 412 of FIG. 4 is preferably generally constrained to be "off" when the first switch 411 is "on," and vice versa. However, it will be appreciated that, generally, practical circuit implementations within the scope of the present invention may be used in which the complementary switches are operated in an approximately or substantially complementary fashion. For example, a switch pair may be operated in a "break before make" fashion, such that one of the switches in the pair is turned off slightly before the other switch in the pair is turned on. In other circuit implementations, a slight amount of overlap of "on" periods of switches of a complementary pair may be allowed, e.g., a "make before break" mode of operation. Techniques for providing such "make before break" and "break before make" operations are known to those of skill in the art, and will not be discussed in greater detail herein.

AC-Powered Operation Referring again to FIG. 4, AC powered operation of the converter 400 may be achieved by coupling the AC power source 10 to the inductor $L_1$ via the seventh switch 441. In such a mode, the first switching circuit 410 may be operated as a variable-boost rectifier, generating respective positive and negative DC voltages V1, V2 on the first and second voltage busses 402a, 402b. The second switching circuit 420 may be operated as a variable-buck inverter, generating the AC output voltage $V_{out}$ from the DC voltages $V_1$, $V_2$ at the first and second voltage busses 402a, 402b. The third switching circuit 430 can be operated as a "balancer," constraining the first and second DC voltage $V_1$, $V_2$ to have particular relative magnitudes, which may be equal or unequal. Exemplary AC-powered operations along the above-described line are described in the aforementioned U.S. patent application Ser. No. 09/374,180.

Under certain conditions, operations of the first and second switching circuits 410, 420 can lead to the production of a DC component in the AC input current $I_{AC}$ at the AC power source 10, which is generally undesirable and, in some cases, prohibited by utility standards. According to an aspect of the present invention, the third switching circuit 430 can be used to control and, therefore reduce this DC component. For example, if respective voltages V1, $V_2$ produced on the first and second voltage busses 402a, 402b for respective half cycles of the AC input voltage $V_{AC}$ are not symmetric due to, for example, component and/or load variation, a DC component may be produced in the AC input current $I_{AC}$ at the AC power source 10. This DC current component can be reduced by controlling the third switching circuit 430 responsive to the AC input current $I_{AC}$ and more particularly, by sensing the DC current component in the AC input current $I_{AC}$ and adjusting the duty cycles of the fifth and sixth switches 431, 432 accordingly. Such control may be implemented, for example, by modulating the fifth and sixth switches 431, 432 of the third switching circuit 430 responsive to a sensed DC component in the AC input current $I_{AC}$ (for example, as determined by the microcontroller 552 of FIG. 5) using feedback control techniques. Feedback control techniques are well-known to those skilled in the art, and will not be described in greater detail.

DC-Powered Operation

FIGS. 6–11 are schematic diagrams illustrating various operational states of a power converter 600 while the converter 600 is operating in a DC-powered (e.g., battery-powered) mode according to embodiments of the present invention. In particular, the power converter 600 of FIGS. 6–11 includes portions of the converter 400 of FIG. 4 with the DC source 12 shown connected between the first voltage bus 402a and the inductor $L_1$, and with the switches 441, 442, diodes $D_1$, $D_2$, and the inductor $L_4$ removed for purposes of clarity of illustration.

Figure 6:
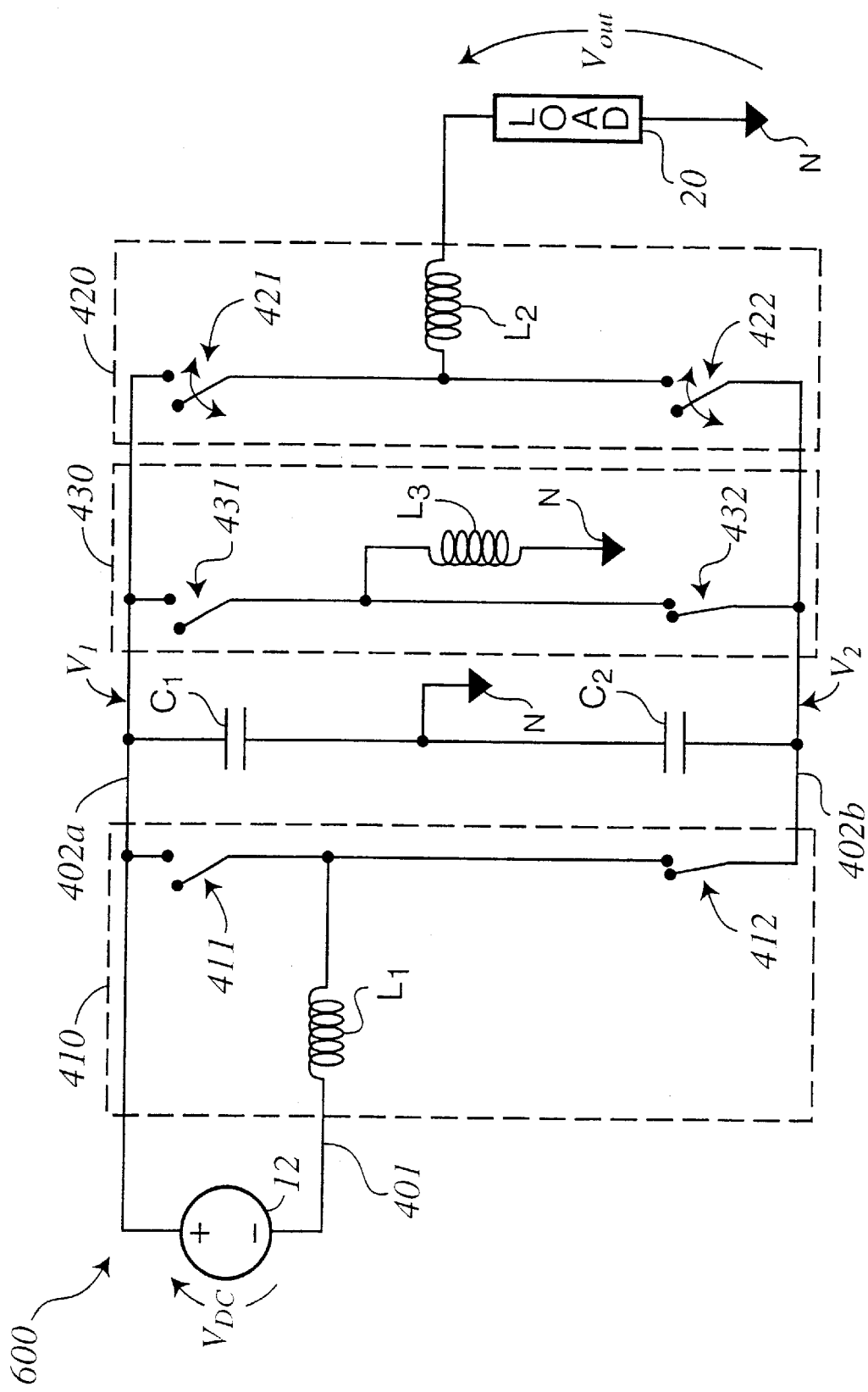
FIGS. 6–11 are schematic diagrams illustrating exemplary operational states of a power converter according to embodiments of the present invention.
Figure 12:
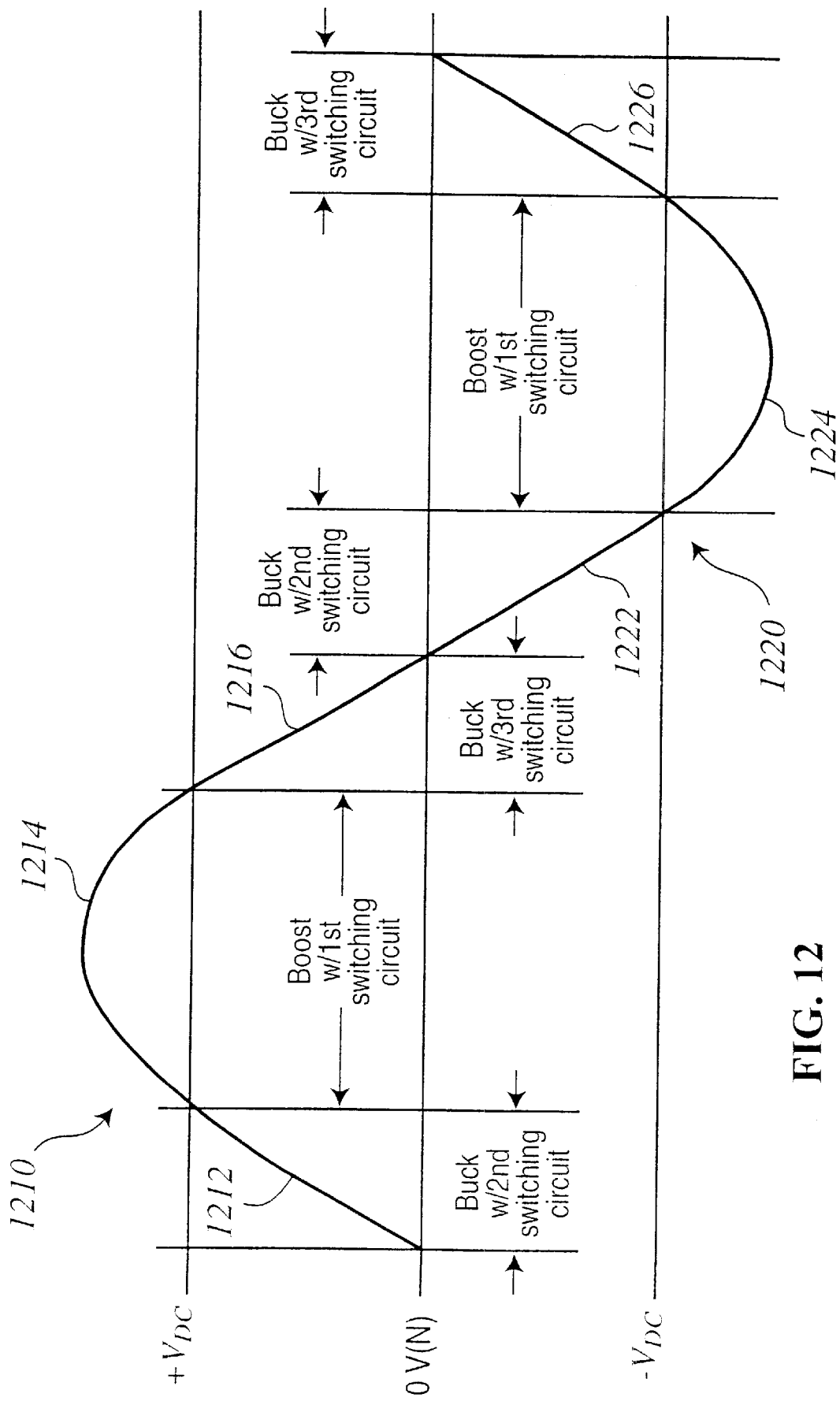
FIGS. 12–13 are waveform diagrams illustrating exemplary DC-powered mode operations of a power converter according to embodiments of the present invention.

FIGS. 6 and 12 illustrate exemplary operations to produce a first portion 1212 of a first half-cycle 1210 of the AC output voltage $V_{out}$ from a DC input voltage $V_{DC}$ produced by a DC power source 12 (e.g., a battery), where the first portion 1212. represents a portion of the first half-cycle 1210 in which the AC output voltage $V_{out}$ has a magnitude that is less than the DC input voltage $V_{DC}$. During the first portion 1212 of the first half cycle 1210, the second switch 412 (from the first switching circuit 410) and the sixth switch 432 (from the third switching circuit 430) are "closed" (i.e., are operated at or near 100% duty cycle), while the first switch 411 (from the first switching circuit 410) and the fifth switch 431 remain "open" (i.e., are operated at or near 0% duty cycle). This effectively references the negative terminal of the DC power source 12 to neutral bus N. 20 The third and fourth switches 421, 422 (from the second switching circuit 420) are variably modulated in a complementary fashion to produce the desired magnitude in the AC output voltage $V_{out}$. For example, when the desired AC output voltage $V_{out}$ is significantly less than the DC input voltage $V_{DC}$, the third switch 421 can be modulated at a relatively low duty cycle, e.g., 10%, while the fourth switch 422 is operated at a relative high complementary duty cycle, e.g., 90%, thus bucking the voltage $V_1$ on the first voltage bus 402a to produce the desired magnitude in the AC output voltage $V_{out}$. As the AC output voltage $V_{out}$ approaches the DC input voltage $V_{DC}$, the duty cycles of the third and fourth switches 421, 422 are increased and decreased, respectively, thus reducing the amount of buck applied. The modulation applied may, for example, be controlled based on a difference between the actual AC output voltage $V_{AC}$ and a desired (reference) voltage waveform, using feedback control techniques that may include, for example, compensation for loop characteristics (e.g., poles and/or zeroes) associated with the converter 600 and/or the load 20. Feedback control techniques are known to those skilled in the art, and will not be discussed in greater detail herein. It will be appreciated that the appropriate control for the third and fourth switches 421, 422 is generally dependent on the values of circuit components, such as the second inductor $L_2$, as well as on the nature of the load 20 and the DC power source 12, such as the value of the DC input voltage $V_{DC}$ produced by the DC power source 12.

Figure 7:
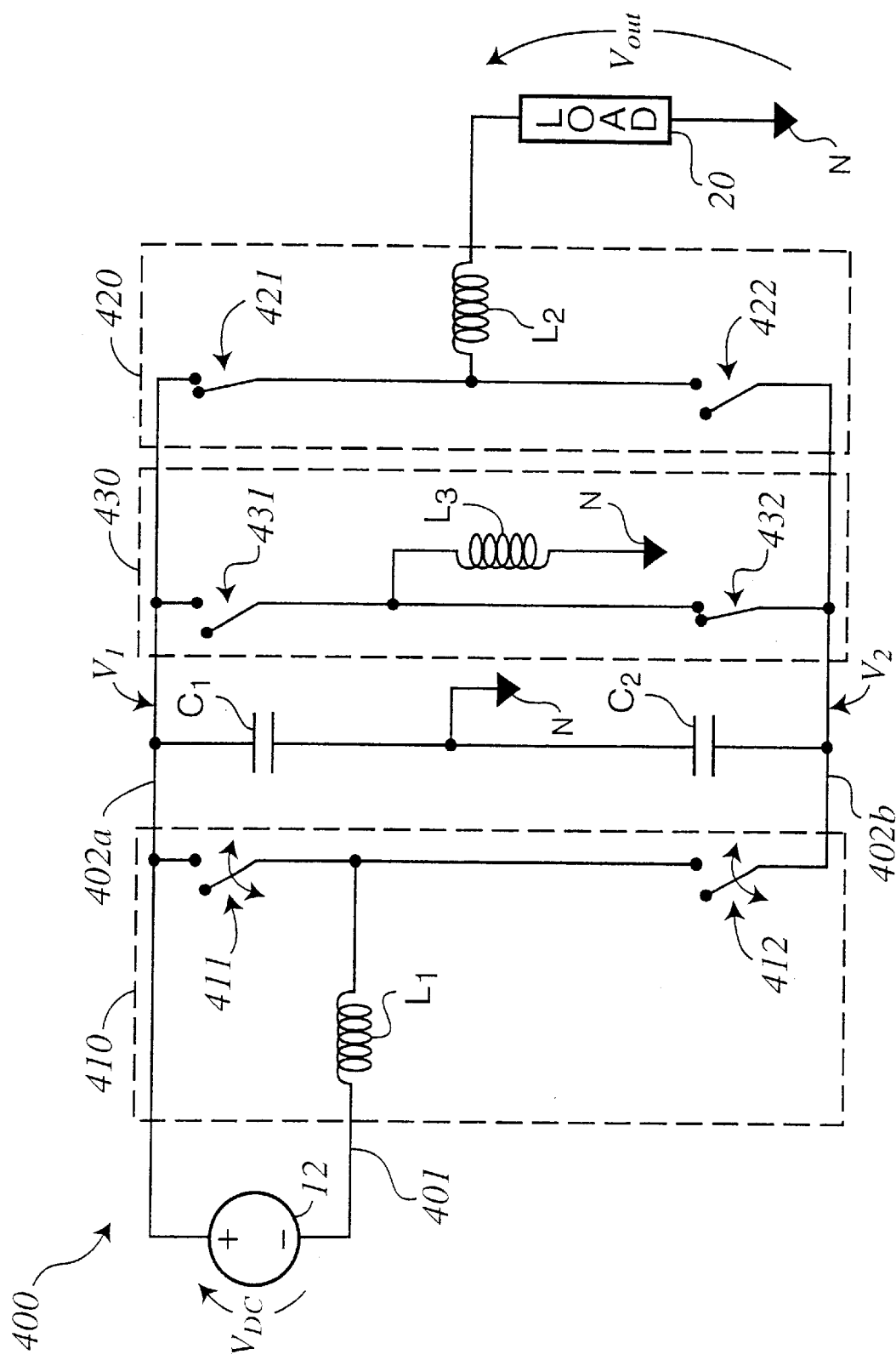

Referring now to FIGS. 7 and 12, when the desired AC output voltage $V_{out}$ exceeds the DC input voltage $V_{DC}$, the converter 600 goes into a "boost" phase. The third and sixth switches 421, 432 are closed (i.e., are operated at or near 100% duty cycle) and the fourth and fifth switches 422, 431 remain open (i.e., are operated at or near 0% duty cycle), while the first and second switches 411, 412 are variably modulated in a complementary fashion to produce a second portion 1214 of the first cycle 1210 of the AC output voltage $V_{out}$. The action of the first and second switches 411, 412 boosts the voltage $V_1$ on the first voltage bus 402a with respect to the neutral bus N, raising the AC output voltage $V_{out}$ above the DC input voltage $V_{DC}$. For example, when the desired AC output voltage $V_{out}$ is relatively near the DC input voltage $V_{DC}$, the first switch 411 can be operated at a relatively high duty cycle (e.g., nearing 100%), while the second switch 412 is operated at a complementarily low duty cycle (e.g., approaching 0%). As the desired AC output voltage $V_{out}$ increases, the duty cycle of the first switch 411 is lowered while the duty cycle of the second switch 412 is increased. Energy stored in the first inductor $L_1$ during "on" phases of the second switch 412 boosts the voltage $V_1$ at the first voltage bus 402a, thus increasing the AC output voltage $V_{out}$. After the desired. AC output voltage $V_{out}$ peaks, the duty cycles of the first and second switches 411, 412 increase and decrease, respectively, allowing the voltage $V_1$ at the first voltage bus 402a to fall, and thus lower the AC output voltage $V_{out}$. The modulation applied to control the AC output voltage $V_{out}$ may, for example, be determined based on a difference between the actual AC output voltage $V_{out}$ and a desired (reference) voltage waveform, using feedback control techniques. It will be appreciated that appropriate control of the first and second switches 411, 412 is generally dependent on the values of circuit components, such as the first inductor $L_1$, as well as on the nature of the load 20 and the DC power source 12.

Figure 8:
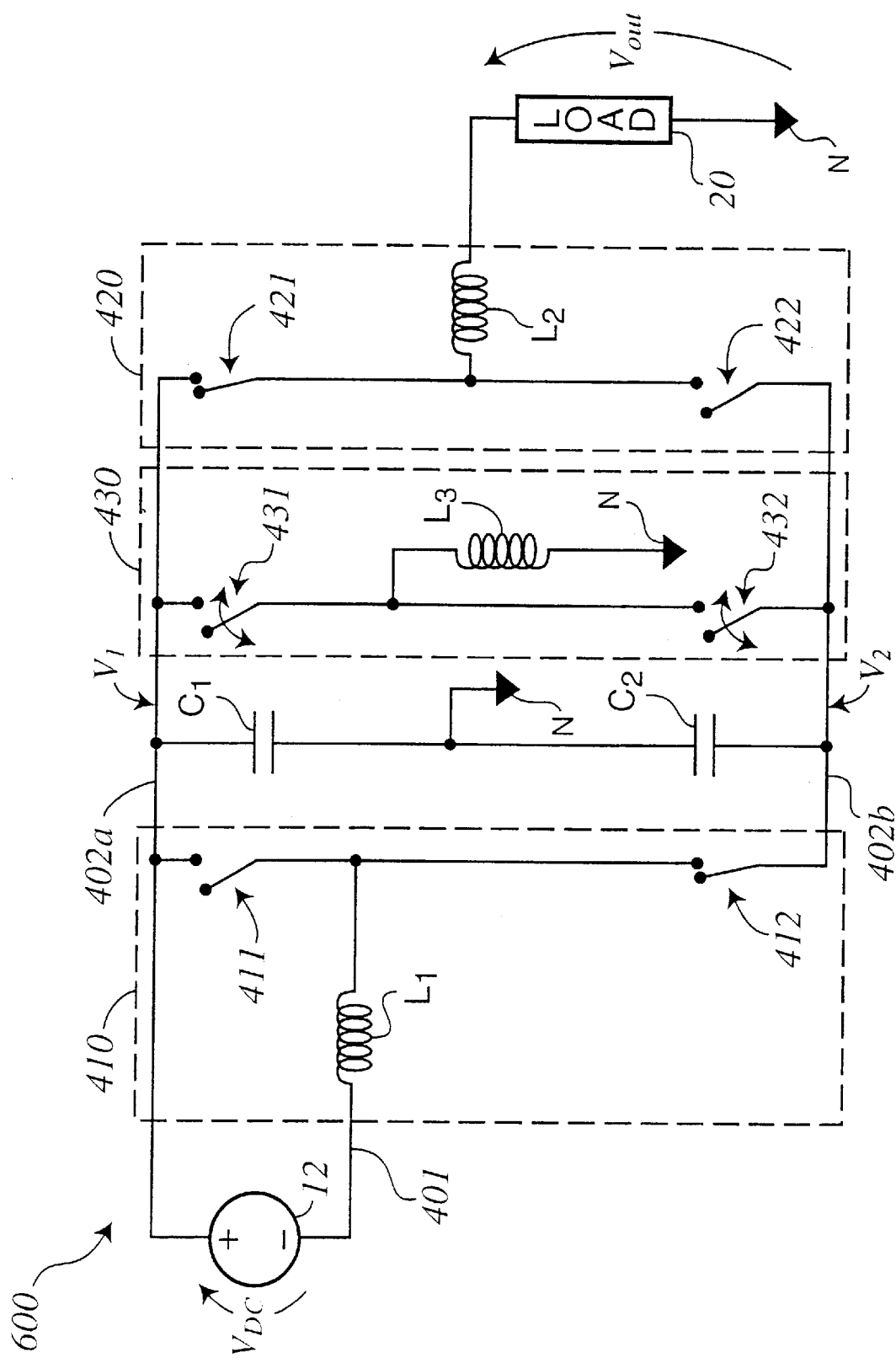

When the desired AC output voltage $V_{out}$ again falls below the DC input voltage $V_{DC}$ for a third portion 1216 of the first half cycle, the converter 600 goes into another buck phase. However, as shown in FIG. 8, in contrast to the first buck phase, the fifth and sixth switches 431, 432 (i.e., the third switching circuit) are modulated to buck the voltage $V_1$ at the first voltage bus 402a and produce the third portion 1216 of the first half cycle 1210. The modulation applied may, for example, be determined based on a difference between the actual AC output voltage $V_{out}$ and a desired (reference) voltage waveform, using feedback control techniques. It will be appreciated that appropriate control of the fifth and sixth switches 431, 432 is generally dependent on the values of circuit components of the converter 600, such as the third inductor $L_2$, as well as on the nature of the load 20 and the DC power source 12. For the third portion 1216 of the first half cycle 1210, the second and third switches 412, 421 remain closed (i.e., are operated at or near 100% duty cycle), while the first and fourth switches 422 remain open (i.e., are operated at or near 0% duty cycle). As the desired AC output voltage $V_{out}$ approaches zero (i.e., the level of the neutral bus) from the positive direction, the duty cycles of the fifth and sixth switches 431, 432 approach 100% and 0%, respectively.

Figure 9:
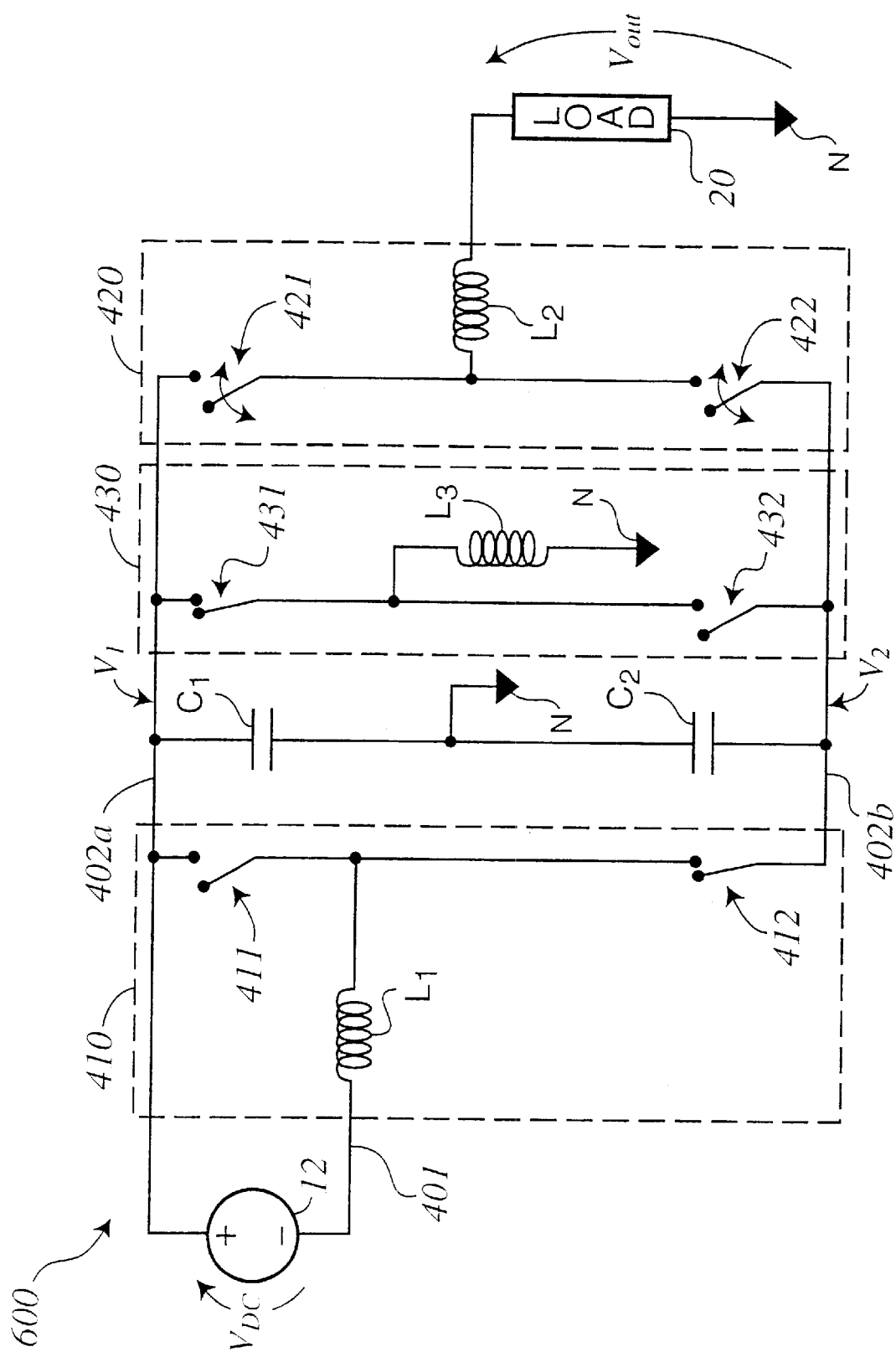

This segues into operations for producing a first portion 1222 of a second, negative half cycle 1220 of the AC output voltage $V_{out}$. Referring to FIGS. 9 and 12, to produce the first portion 1222 of the second half-cycle 1220, the second and fifth switches 412, 431 are maintained in a closed state, while the first and sixth switches 411, 432 remain open. In this manner, the DC power source 12 has its positive terminal referenced to the neutral bus N and its negative terminal tied to the second voltage bus 402b, providing a "negative" DC source for driving the second voltage bus 402b. During the first portion 1222 of the second half cycle 1220, the third and fourth switches 421, 422 are variably modulated in a complementary fashion at appropriate duty cycles to buck the voltage $V_2$ on the second voltage bus 402b and produce a desired AC output voltage $V_{out}$ having a magnitude less than that of the DC input voltage $V_{DC}$. The modulation applied may, for example, be determined based on a difference between the actual AC output voltage $V_{out}$ and a desired (reference) voltage waveform, using feedback control techniques. It will be appreciated that appropriate control for the third and fourth switches 421, 422 is generally dependent on the values of circuit components of the converter 600, such as the second inductor $L_2$, as well as on the nature of the load 20 and the DC power source 12.

Figure 10:
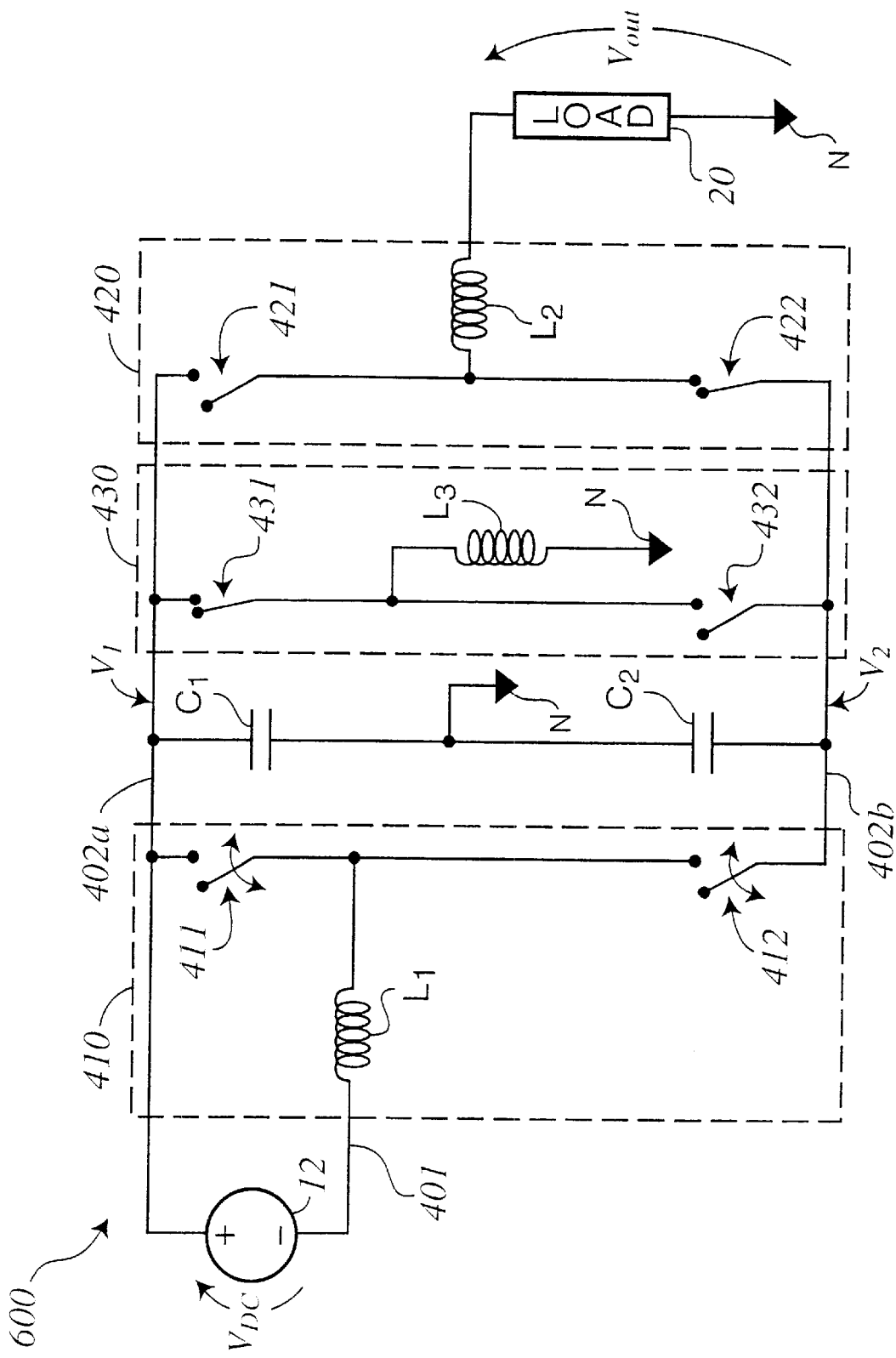

This operational phase continues until the magnitude of the desired AC output voltage $V_{out}$ exceeds the magnitude of the DC input voltage $V_{DC}$. Referring to FIGS. 10 and 12, in this operational phase, the fourth and fifth switches 422, 431 are closed (i.e., are operated at or near 100% duty cycle), while the third and sixth switches 421, 432 are left open (i.e., are operated at or near 0% duty cycle). The first and second switches 411, 412 are variably modulated at appropriate complementary duty cycles to boost the magnitude of the voltage $V_2$ at the second voltage bus 402b above the magnitude of the DC input voltage $V_{DC}$ (i.e., to make the voltage $V_2$ more negative than the negative terminal of the DC power source 12 with respect to the neutral bus N) and thus produce a second portion 1224 of the second half cycle 1220. The modulation applied may, for example, be determined based on a difference between the actual AC output voltage $V_{out}$. It will be appreciated that appropriate control of the first and second switches 421, 422 is generally dependent on the values of circuit components of the converter 600, such as the first inductor $L_2$, as well as on the nature of the load 20 and the DC power source 12.

Figure 11:
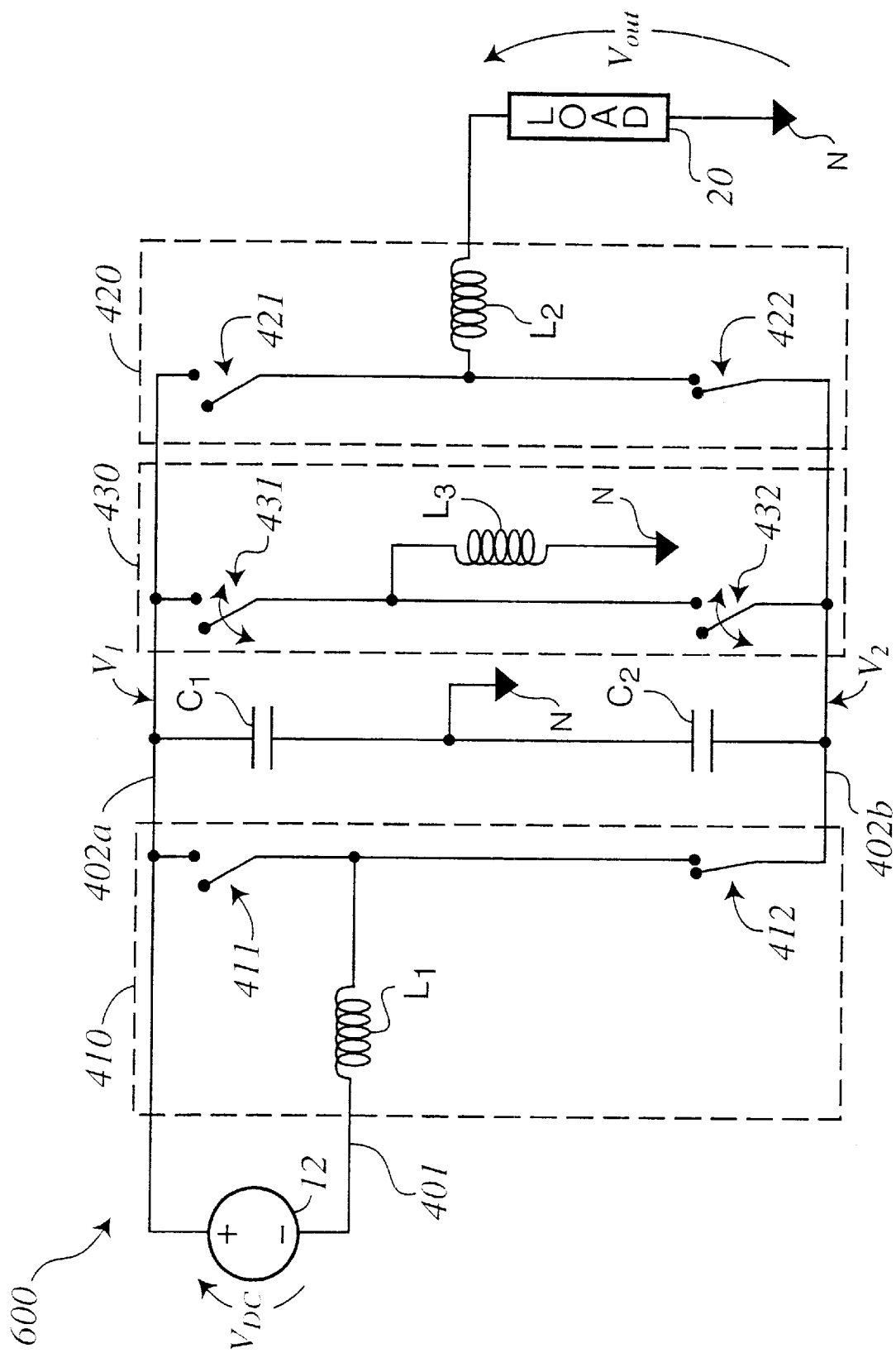

Referring now to FIGS. 11 and 12, to produce third portion 1226 of the second half cycle 1220 for which the magnitude of the desired AC output voltage $V_{out}$ is less than the magnitude of the DC input voltage $V_{DC}$, the converter 600 goes into another buck phase. The second and fourth switches 412, 422 are closed (i.e., are operated at or near 100% duty cycle) and the first and third switches 411, 421 are open (i.e., are operated at or near 0% duty cycle) while the fifth and sixth switches 431, 432 are variably modulated at appropriate complementary duty cycles to buck the voltage $V_2$ at the second voltage bus 402b and produce the desired AC output voltage $V_{out}$. The modulation applied may, for example, be determined based on a difference between the actual AC output voltage $V_{out}$ and a desired (reference) voltage waveform, using feedback control techniques. It will be appreciated that appropriate control of the fifth and sixth switches 431, 432 is generally dependent on the values of circuit components, such as the third inductor $L_3$, as well as on the nature of the load 20 and the DC power source 12. As the desired AC output voltage $V_{out}$ approaches zero from the negative direction, the duty cycles of the fifth and sixth switches 431, 432 approach 0% and 100%, respectively, returning the negative terminal of the DC power source 12 to a neutral reference and segueing into operations for producing a next, positive half cycle, as described above.

It will be understood that the above sequence of operations can be varied within the scope of the present invention. In other embodiments of the present invention, a different sequence of the operational states illustrated in FIGS. 6, 7, 10, 11 and 13 may be used to generate an AC output voltage.

Figure 13:
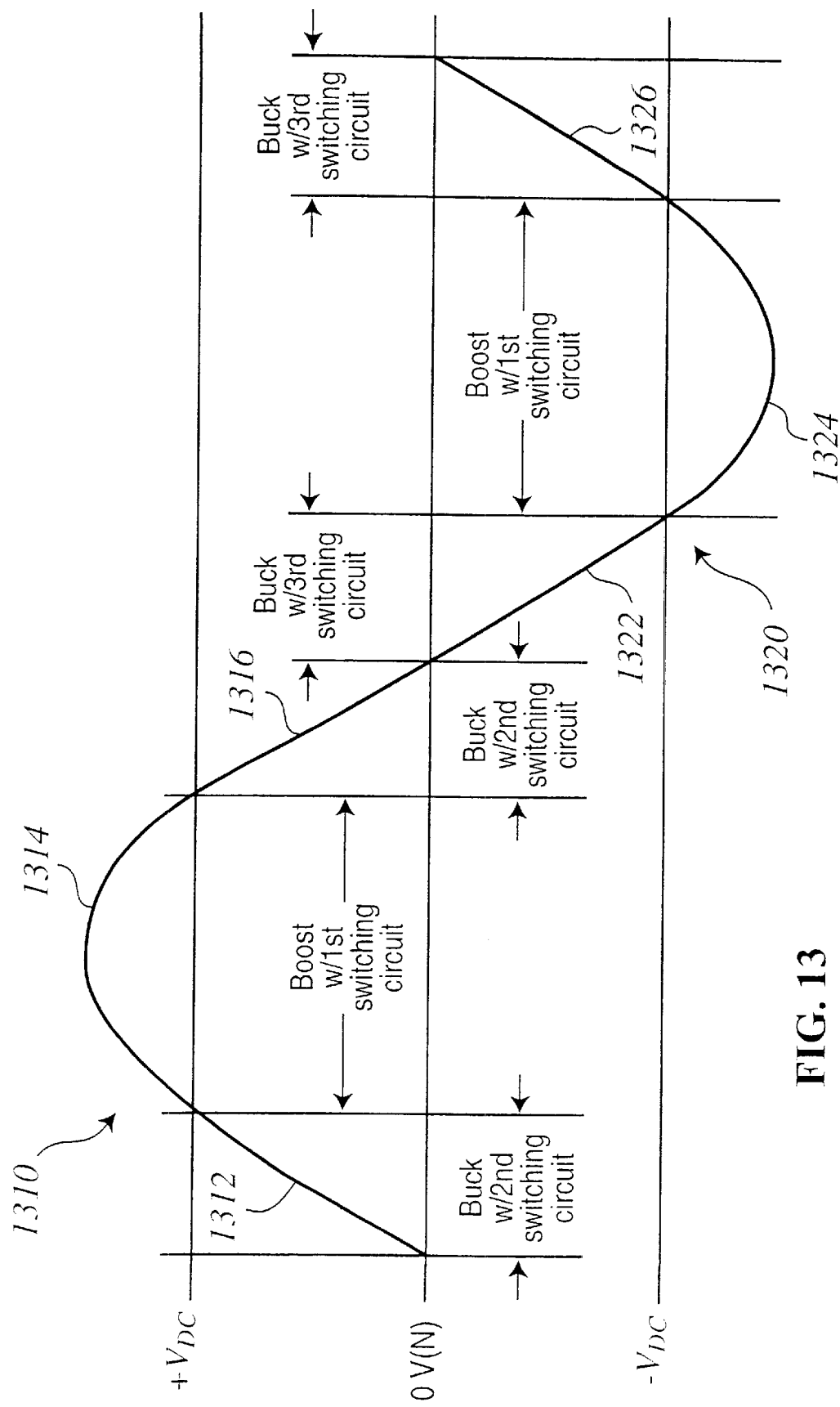

FIGS. 6 and 13 illustrate operations to produce a first portion 1312 of a first half-cycle 1310 of the AC output voltage $V_{out}$ from a DC input voltage $V_{DC}$ produced by a DC power source 12 (e.g., a battery), where the first portion 1312 represents a portion of the first half-cycle 1310 in which the AC output voltage $V_{out}$ has a magnitude that is less than the DC input voltage $V_{DC}$. During the first portion 1312 of the first half cycle 1310, the second switch 412 (from the first switching circuit 410) and the sixth switch 432 (from the third switching circuit 430) are "closed" (i.e., are operated at or near 100% duty cycle), while the first switch 411 (from the first switching circuit 410) and the fifth switch 431 remain "open" (i.e., are operated at or near 0% duty cycle). This effectively references the negative terminal of the DC power source 12 to neutral bus N.

The third and fourth switches 421, 422 (from the second switching circuit 420) are variably modulated in a complementary fashion to produce the desired magnitude in the AC output voltage $V_{out}$. For example, when the desired AC output voltage $V_{out}$ is significantly less than the DC input voltage $V_{DC}$, the third switch 421 can be modulated at a relatively low duty cycle, e.g., 10%, while the fourth switch 422 is operated at a relative high complementary duty cycle, e.g., 90%, thus bucking the voltage $V_1$ on the first voltage bus 402a to produce the desired magnitude in the AC output voltage $V_{out}$. As the AC output voltage $V_{out}$ approaches the DC input voltage $V_{DC}$, the duty cycles of the third and fourth switches 421, 422 are increased and decreased, respectively, thus reducing the amount of buck applied. The modulation applied may, for example, be controlled based on a difference between the actual AC output voltage $V_{AC}$ and a desired (reference) voltage waveform, using feedback control techniques that may include, for example, compensation for loop characteristics (e.g., poles and/or zeroes) associated with the converter 600 and/or the load 20. Feedback control techniques are known to those skilled in the art, and will not be discussed in greater detail herein. It will be appreciated that the appropriate control for the third and fourth switches 421, 422 is generally dependent on the values of circuit components, such as the second inductor $L_2$, as well as on the nature of the load 20 and the DC power source 12, such as the value of the DC input voltage $V_{DC}$ produced by the DC power source 12.

Referring now to FIGS. 7 and 13, when the desired AC output voltage $V_{out}$ exceeds the DC input voltage $V_{DC}$, the converter 600 goes into a "boost" phase. The third and sixth switches 421, 432 are closed (i.e., are operated at or near 100% duty cycle) and the fourth and fifth switches 422, 431 remain open (i.e., are operated at or near 0% duty cycle), while the first and second switches 411, 412 are variably modulated in a complementary fashion to produce a second portion 1314 of the first cycle 1310 of the AC output voltage $V_{out}$. The action of the first and second switches 411, 412 boosts the voltage $V_1$ on the first voltage bus 402a with respect to the neutral bus N, raising the AC output voltage $V_{out}$ above the DC input voltage $V_{DC}$. For example, when the desired AC output voltage $V_{out}$ is relatively near the DC input voltage $V_{DC}$, the first switch 411 can be operated at a relatively high duty cycle (e.g., nearing 100%), while the second switch 412 is operated at a complementarily low duty cycle (e.g., approaching 0%). As the desired AC output voltage $V_{out}$ increases, the duty cycle of the first switch 411 is lowered while the duty cycle of the second switch 412 is increased. Energy stored in the first inductor $L_1$ during "on" phases of the second switch 412 boosts the voltage $V_1$ at the first voltage bus 402a, thus increasing the AC output voltage $V_{out}$. After the desired AC output voltage $V_{out}$ peaks, the duty cycles of the first and second switches 411, 412 increase and decrease, respectively, allowing the voltage $V_1$ at the first voltage bus 402a to fall, and thus lower the AC output voltage $V_{out}$. The modulation applied to control the AC output voltage $V_{out}$ may, for example, be determined based on a difference between the actual AC output voltage $V_{out}$ and a desired (reference) voltage waveform, using feedback control techniques. It will be appreciated that appropriate control of the first and second switches 411, 412 is generally dependent on the values of circuit components, such as the first inductor $L_1$, as well as on the nature of the load 20 and the DC power source 12.

When the desired AC output voltage $V_{out}$ again falls below the DC input voltage $V_{DC}$ for a third portion 1316 of the first half cycle 1310, the converter 600 reverts to the first buck mode of operation illustrated in FIG. 6. The second switch 412 and the sixth switch 432 are "closed" (i.e., are operated at or near 100% duty cycle), while the first switch 411 and the fifth switch 431 remain "open" (i.e., are operated at or near 0% duty cycle). The third and fourth switches 421, 422 are variably modulated in a complementary fashion to produce the desired magnitude in the AC output voltage $V_{out}$. For example, when the desired AC output voltage $V_{out}$ is relatively near the DC input voltage $V_{DC}$, the third switch 421 can be modulated at a relatively high duty cycle, e.g., 90%, while the fourth switch 422 is operated at a relative low complementary duty cycle, e.g., 10%, thus slightly bucking the voltage $V_1$ on the first voltage bus 402a to produce the desired magnitude in the AC output voltage $V_{out}$. As the AC output voltage $V_{out}$ approaches the level of the neutral bus (0 V), the duty cycles of the third and fourth switches 421, 422 are decreased and increased, respectively, thus increasing the amount of buck applied. The modulation applied may, for example, be controlled based on a difference between the actual AC output voltage $V_{AC}$ and a desired (reference) voltage waveform, using feedback control techniques that may include, for example, compensation for loop characteristics (e.g., poles and/or zeroes.) associated with the converter 600 and/or the load 20. Feedback control techniques are known to those skilled in the art, and will not be discussed in greater detail herein. It will be appreciated that the appropriate control for the third and fourth switches 421, 422 is generally dependent on the values of circuit components, such as the second inductor $L_2$, as well as on the nature of the load 20 and the DC power source 12, such as the value of the DC input voltage $V_{DC}$ produced by the DC power source 12. As the desired AC output voltage $V_{out}$ approaches zero (i.e., the level of the neutral bus) from the positive direction, the duty cycles of the third and fourth switches 421, 422 approach 0% and 100%, respectively.

This segues into operations for producing a first portion 1322 of a second, negative half cycle 1320 of the AC output voltage $V_{out}$. Referring to FIGS. 11 and 13, to produce the first portion 1322 of the second half cycle 1320 for which the magnitude of the desired AC output voltage $V_{out}$ is less than the magnitude of the DC input voltage $V_{DC}$, the converter 600 goes into another buck phase. The second and fourth switches 412, 422 are closed (i.e., are operated at or near 100% duty cycle) and the first and third switches 411, 421 are open (i.e., are operated at or near 0% duty cycle) while the fifth and sixth switches 431, 432 are variably modulated at appropriate complementary duty cycles to buck the voltage $V_2$ at the second voltage bus 402b and produce the desired AC output voltage $V_{out}$. The modulation applied may, for example, be determined based on a difference between the actual AC output voltage $V_{out}$ and a desired (reference) voltage waveform, using feedback control techniques. It will be appreciated that appropriate control of the fifth and sixth switches 431, 432 is generally dependent on the values of circuit components, such as the third inductor $L_3$, as well as on the nature of the load 20 and the DC power source 12.

This operational phase continues until the magnitude of the desired AC output voltage $V_{out}$ exceeds the magnitude of the DC input voltage $V_{DC}$. Referring to FIGS. 10 and 13, in this operational phase, the fourth and fifth switches 422, 431 are closed (i.e., are operated at or near 100% duty cycle), while the third and sixth switches 421, 432 are left open (i.e., are operated at or near 0% duty cycle). The first and second switches 411, 412 are variably modulated at appropriate complementary duty cycles to boost the magnitude of the voltage $V_2$ at the second voltage bus 402b above the magnitude of the DC input voltage $V_{DC}$ (i.e., to make the voltage $V_2$ more negative than the negative terminal of the DC power source 12 with respect to the neutral bus N) and thus produce a second portion 1324 of the second half cycle 1320. The modulation applied may, for example, be determined based on a difference between the actual AC output voltage $V_{out}$. It will be appreciated that appropriate control of the first and second switches 421, 422 is generally dependent on the values of circuit components of the converter 600, such as the first inductor $L_2$, as well as on the nature of the load 20 and the DC power source 12.

Referring now to FIGS. 11 and 13, to produce third portion 1326 of the second half cycle 1320 for which the magnitude of the desired AC output voltage $V_{out}$ is less than the magnitude of the DC input voltage $V_{DC}$, the converter 600 goes back into the buck mode illustrated in FIG. 11. The second and fourth switches 412, 422 are closed (i.e., are operated at or near 100% duty cycle) and the first and third switches 411, 421 are open (i.e., are operated at or near 0% duty cycle) while the fifth and sixth switches 431, 432 are variably modulated at appropriate complementary duty cycles to buck the voltage $V_2$ at the second voltage bus 402b and produce the desired AC output voltage $V_{out}$. The modulation applied may, for example, be determined based on a difference between the actual AC output voltage $V_{out}$ and a desired (reference) voltage waveform, using feedback control techniques. It will be appreciated that appropriate control of the fifth and sixth switches 431, 432 is generally dependent on the values of circuit components, such as the third inductor $L_3$, as well as on the nature of the load 20 and the DC power source 12. As the desired AC output voltage $V_{out}$ approaches zero from the negative direction, the duty cycles of the fifth and sixth switches 431, 432 approach 0% and 100%, respectively, returning the negative terminal of the DC power source 12 to a neutral reference and segueing into operations for producing a next, positive half cycle, as described above.

A potential benefit of the present invention lies in an ability to limit the peak voltages produced across the switches 411, 412, 421, 422, 431, 432, a benefit arising from "moving" the DC power source 12 from reference between the positive DC voltage bus (the first voltage bus 402*a*) and the neutral bus to reference between the neutral bus and the negative DC voltage bus (the second voltage bus 402*b*) during successive half cycles of the AC output voltage $V_{out}$. This technique can reduce the blocking voltage requirements for semiconductor devices (e.g., transistors, IGBTs, or similar devices) used to implement the switches 411, 412, 421, 422, 431, 432 in comparison to other designs. This, in turn, can reduce the stress on these semiconductor devices and/or allow the use of semiconductor devices with lower voltage ratings than would be needed, for example, for designs in which the negative terminal of the DC power source is fixedly referenced to the neutral bus.

It will be appreciated that the operations described above can be varied in other ways within the scope of the present invention, such as by using other sequences of the operational states illustrated in FIGS. 6–11. In addition, although the first, second, third, fourth, fifth and sixth switches 411, 412, 421, 422, 431, 432 are referred to in the foregoing discussion as being maintained in "open" or "closed" states during the phases of operation of the converter 600 that produce the waveform portions 1212, 1214, 1216, 1222, 1224, 1226, it will be appreciated that these "open" and "closed" states include "substantially open" and "substantially closed" states, respectively, i.e., duty cycles greater than 0% and less than 100%, respectively. Generally, such "less open" or "less closed" operation results in changes in operating points of the converter 600, such as changes in the voltages V1, $V_2$ produced at the first and second voltage busses 402*a*, 402*b* during the various phases of operation. To maintain the desired output voltage $V_{out}$, these changes can be compensated for by correspondingly modifying operation of the particular switching circuit 410, 420, 430 that is variably modulated to produce the desired AC output voltage $V_{out}$ during a particular operational phase. Thus, for example, to produce the second portion 1214 of the first cycle of the AC output voltage $V_{out}$ (in which the first switching circuit 410 boosts the DC input voltage $V_{DC}$ to produce the first voltage $V_1$ on the first voltage bus 402*a*), the third and fourth switches 421, 422 may be operated at respective duty cycles sufficiently less than 100% and sufficiently greater than 0%, respectively, such that the AC output voltage $V_{out}$ is bucked with respect to the voltage $V_1$. In order to compensate for this bucking action, the first and second switches 411, 412 may be modulated to achieve an increased boost of the voltage $V_1$ on the first voltage bus 402*a*. Similar control may be implemented during the other phases of operation.

It will also be appreciated that complementary or "mirror image" implementations also fall within the scope of the present invention. For example, rather than fixedly connecting the positive terminal of the DC power source 12 to the first voltage bus 402*a* and allowing the negative terminal of the DC power source 12 to change reference between the neutral bus N and the second voltage bus 402*a*, the negative terminal of the DC power source 12 could be fixedly connected to the second voltage bus 402*b* while the positive terminal of the DC power source changes reference between the neutral bus N and the first voltage bus 402*a* using a set of switching operations that are complementary to the ones described above.

Charging Operations

Figure 14:
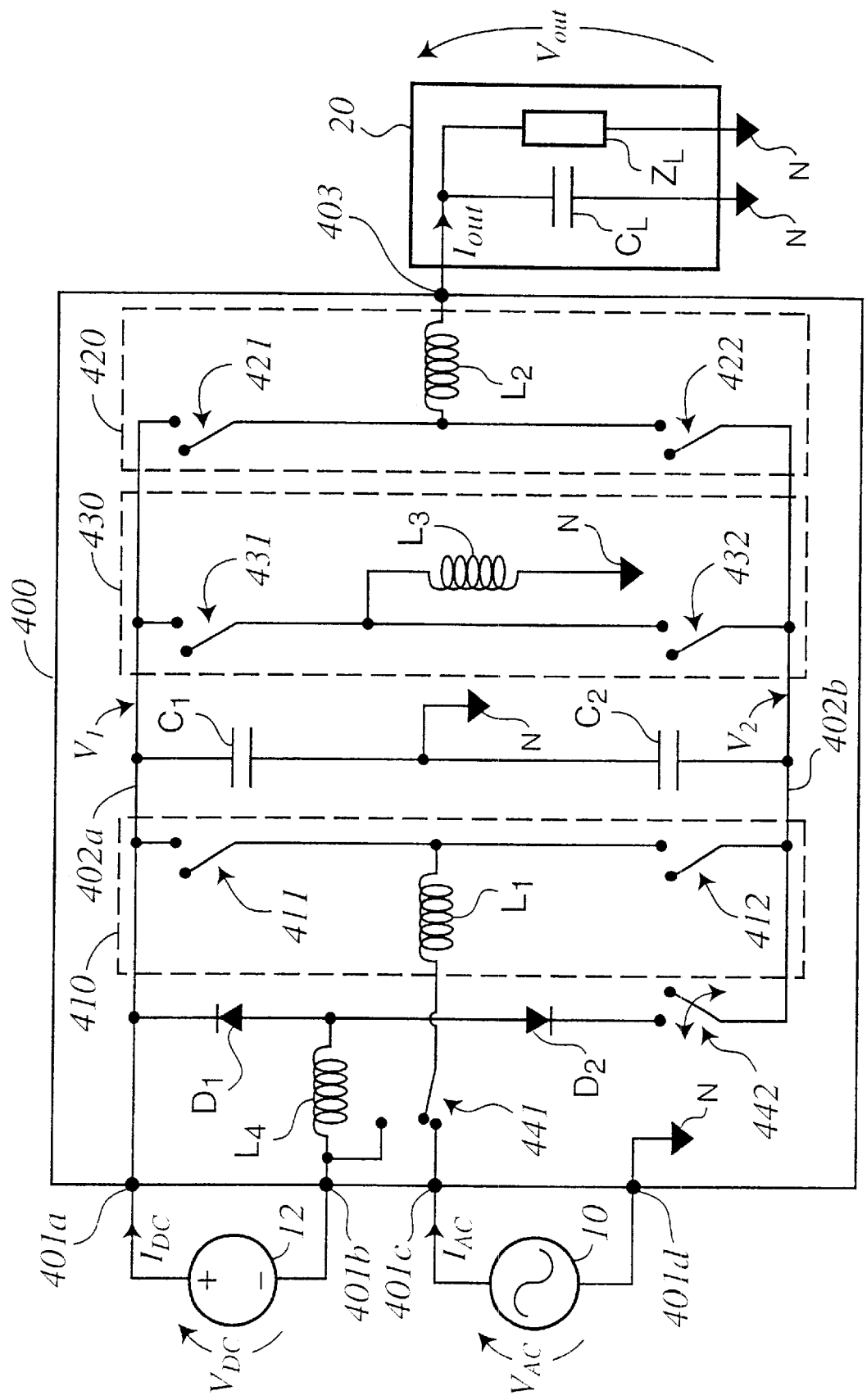
FIG. 14 is a schematic diagram illustrating exemplary charging mode operations of a power converter according to other embodiments of the present invention.

Exemplary charging operations for the converter 400 of FIG. 4 will now be described with reference to FIGS. 14 and 15. As illustrated in FIG. 14, when the seventh switch 441 connects the first inductor $L_1$ to the AC power source 10 and the converter 400 is operating in an AC-powered mode as described above, the eighth switch 442 may be modulated to provide charging current to a DC power source 12. Preferably, the eighth switch 442 intermittently (e.g., at a 20 kHz rate) couples the DC power source 12 between the first and second voltage busses 402*a*, 402*b* through the fourth inductor $L_4$ and diode $D_2$. More preferably, the eighth switch 442 is modulated such that current in the fourth inductor $L_4$ approaches zero before the eighth switch 442 again couples the DC power source 12 between the first and second voltage busses 402*a*, 402*b*.

Figure 15:
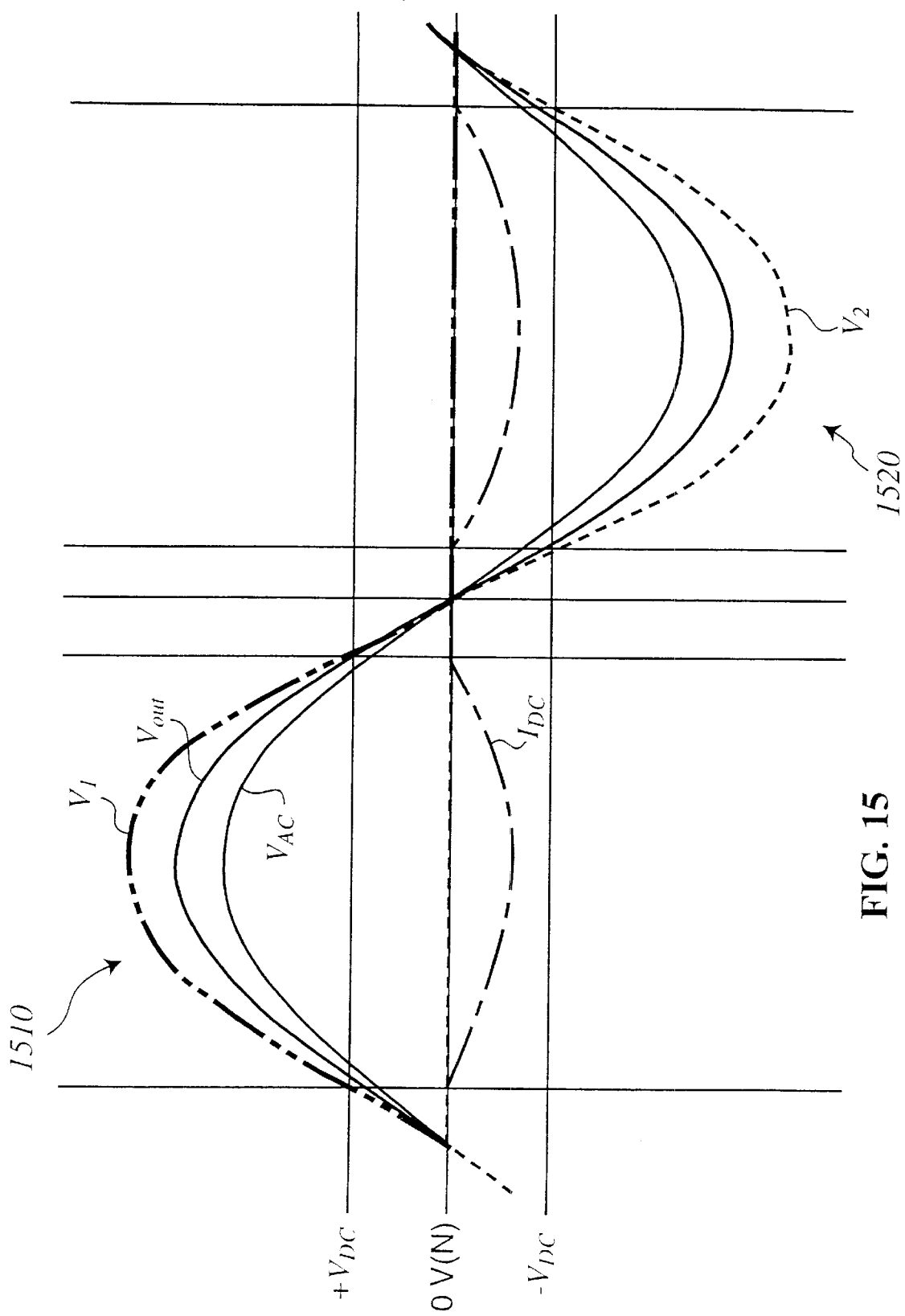
FIG. 15 is a waveform diagram illustrating exemplary charging mode operations for the embodiments of FIG. 14.

Referring to FIG. 15, in a first half-cycle 1510 of the AC input voltage $V_{AC}$, the first switch 411 is operated at a relatively high duty cycle while the second switch 412 is operated at a relatively low complementary duty cycle, producing a relatively large positive voltage $V_1$ on the first voltage bus 402*a* and a relatively low voltage $V_2$ on the second voltage bus 402*a*. As described above and in the aforementioned U.S. Pat. application Ser. No. 09/374,180, the relative magnitudes of the voltages $V_1$, $V_2$ on the first and second voltage busses 402*a*, 402*b* can be controlled by controlling the relative duty cycles of the fifth and sixth switches 431, 432 of the third switching circuit 430 (which operates as a "balancer" in this AC powered mode). For the embodiment illustrated in FIG. 15, the third switching circuit 430 is operated such that in the first half cycle 1510 of the AC input voltage $V_{AC}$, the voltage $V_2$ on the second voltage bus 402*b* approaches the level of the neutral bus N (~0V). Consequently, the magnitude of the voltage across the series combination of the DC power source 12 and the fourth inductor $L_4$ when the eighth switch 442 is closed is approximately the magnitude of the voltage $V_1$ on the first voltage bus 402*a* with respect to the neutral bus N.

Little or no charging current $I_{DC}$ flows from the first voltage bus 402*a* to the DC power source 12 until the magnitude of the voltage $V_1$ on the first voltage bus 402*a* exceeds the DC voltage $V_{DC}$ produced by the DC power source 12. When the magnitude of the voltage $V_1$ on the first voltage bus 402*a* exceeds the DC voltage $V_{DC}$, however, a non-zero current $I_{DC}$ (here shown as negative to indicate flow into the DC power source 12) flows into the DC power source 12, until the magnitude of the voltage $V_1$ on the first voltage bus 402*a* again is less than the DC voltage $V_{DC}$. It will be appreciated that in FIG. 15, the current $I_{DC}$ is shown as an average, with ripples produced by modulation of the eighth switch 442 not shown for purposes of clarity of illustration.

In a second half-cycle 1520 of the AC input voltage $V_{AC}$, the first switch 411 is operated at a relatively low duty cycle while the second switch 412 is operated at a relatively high duty cycle. As a result, a relatively large negative voltage $V_2$ is produced on the second voltage bus 402*b* and a relatively small positive voltage $V_1$ is produced on the first voltage bus 402*a*. Similar to operations in the first half cycle 1510, the third switching circuit 430 is operated such that the voltage $V_1$ on the first voltage bus 402*a* approaches the level of the neutral bus N (~0V). Consequently, the magnitude of the voltage across the series combination of the DC power source 12 and the fourth inductor $L_4$ when the eighth switch 442 is closed is approximately the magnitude of the voltage $V_2$ on the second voltage bus 402*b* with respect to the neutral bus N.

Also similar to the first cycle 1510, little or no current $I_{DC}$ flows into the DC power source 12 until the magnitude of the voltage $V_2$ on the second voltage bus 402*b* exceeds the DC voltage $V_{DC}$. However, when the magnitude of the voltage $V_2$ on the second voltage bus 402*b* exceeds the DC voltage $V_{DC}$ produced by the DC power source 12, a current $I_{DC}$ flows into the DC power source 12 until the magnitude of the voltage $V_2$ on the second voltage bus 402b again is less than the DC voltage $V_{DC}$. Accordingly, it can be seen that the DC power source 12 draws current from the AC source 10 in a "full-wave" fashion, i.e., in both the positive and negative half cycles 1510, 1520. This full-wave charging can be advantageous in comparison to charging modes in which the DC power source 12 is charged only in a particular half-cycle (positive or negative), as it can reduce peak currents handled by the switching elements of the converter 400.

A limitation on the charging current $I_{DC}$ delivered to the DC power source 12 can arise from lack of current flow into the DC power source 12 until the voltage across the series combination of the DC power source 12 and the fourth inductor $L_4$ exceeds the DC voltage $V_{DC}$. For example, if the DC power source 12 is a 120V battery and the converter 400 is operated such that the voltages $V_1$, $V_2$ conform to a 120V (rms) sinewave in the respective positive and negative half cycles 1510, 1520, little or no current would flow into the DC power source 12 for a significant portion of the AC cycle (~50%).

According to another aspect of the present invention, a desired charging current may be achieved by boosting the voltages $V_1$, $V_2$ on the first and second voltage busses 402a, 402b using the first switching circuit 410, while correspondingly controlling the second switching circuit 420 to produce a desired level in the AC output voltage $V_{out}$. As described above, a boost in the voltages $V_1$, $V_2$ produced on the first and second voltage busses 402a, 402b can be achieved by increasing the boost produced by the first switching circuit 410. This can increase the portion of the first and second half cycles 1510, 1520 during which the current $I_{DC}$ flowing into the DC power source 12 is greater than zero. While operating the first switching circuit 410 in such a manner, the second switching circuit 420 can be operated in a buck mode to produce a desired AC output voltage $V_{out}$. It will be understood that, in general, the voltages $V_1$, $V_2$ on the first and second voltage busses 402a, 402b can be increased and decreased to control the charging of the DC power source 12 within constraints arising from the voltage ratings of the switches 411, 412, 421, 422, 431, 432, the current demands of the load 20, and other factors.

Power Converter with Added Storage Capability

Figure 16:
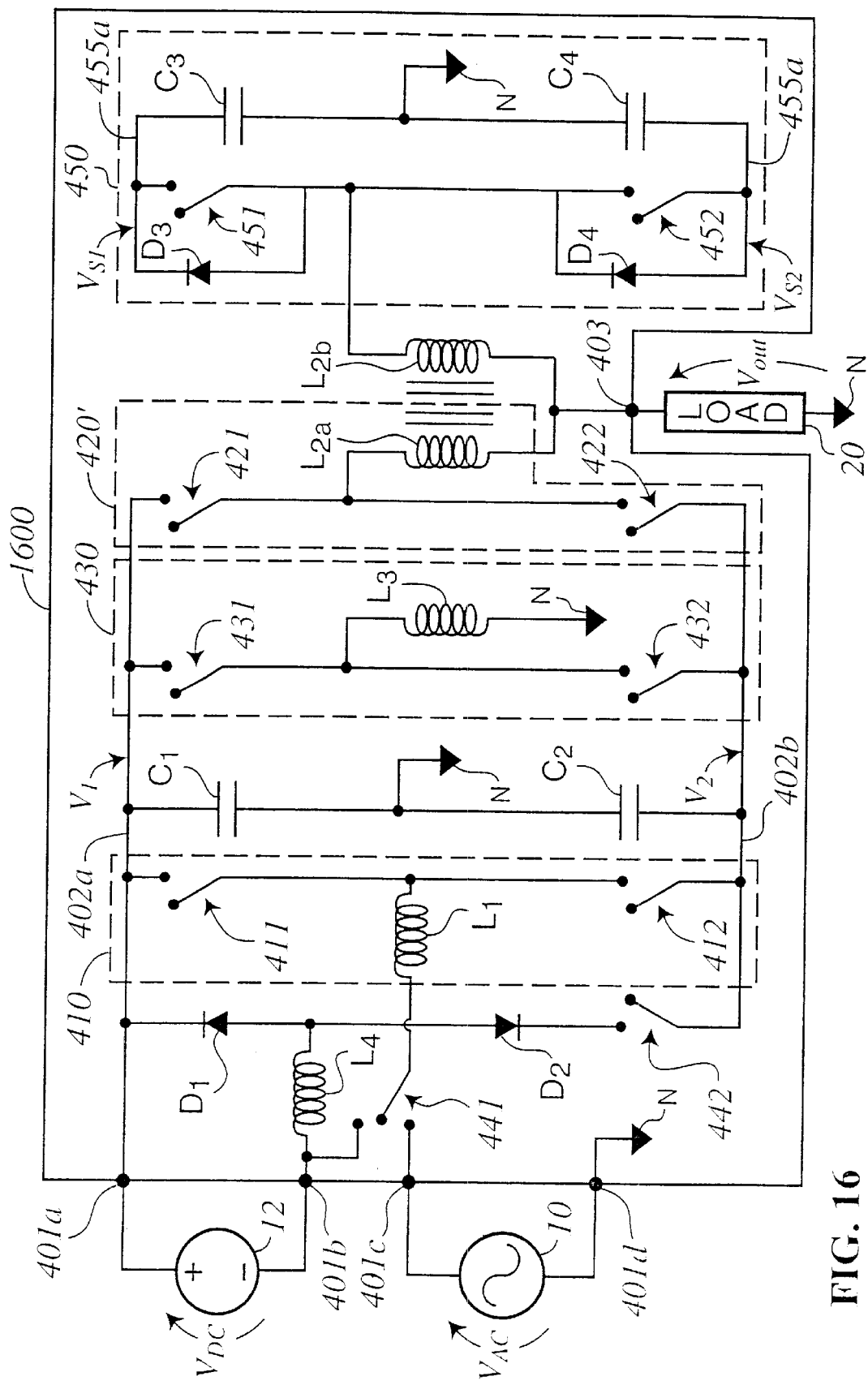
FIG. 16 is a schematic diagram illustrating a power converter according to other embodiments of the present invention.

FIG. 16 illustrates a power converter 1600 according to another embodiment of the present invention. The power converter 1600 includes first and third switching circuits 410, 430 that operate as described above with reference to FIG. 4. A second switching circuit 420's includes switches 421, 422 and an output inductor $L_{2a}$ that is electrically and inductively coupled to a second inductor $L_{2b}$ that forms part of a storage circuit 450.

The storage circuit 450 includes ninth and tenth switches 451, 452 that selectively couple first and second storage busses 455a, 455b to an output terminal 403 via the coupled inductor $L_{2b}$. Respective freewheeling diodes $D_3$, $D_4$ are connected across respective ones of the ninth and tenth switches 451, 452. It will be appreciated that the ninth and tenth switches 455a, 455b and the freewheeling diodes $D_3$, $D_4$ may be implemented using, for example, discrete switching transistors (e.g., IGBTs) and discrete diodes, or may be implemented using integrated transistor/diode combinations. The ninth and tenth switches 451, 452 may be controlled using a microcontroller, microprocessor or other controller, for example, using a switch control circuit such as the switch control circuit 540 of FIG. 5.

Respective storage capacitors $C_3$, $C_4$ connect respective ones of the first and second storage busses 455a, 455b to the neutral bus N, and provide energy storage. In a "line adaptive" mode of operation, the presence of the storage circuit 450 can provide the converter 1600 with the capability to provide power to the load 20 when transitioning between an AC-powered mode and a DC powered mode. In addition, in an "online" mode of operation, the presence of the storage circuit 450 can enable the power converter 1600 to operate in concert with the first, second and third switching circuits 410, 420', 430 to provide control of the current waveform drawn from the AC source 10. In this manner, the power converter 1600 can implement power factor control.

Line Adaptive Operation

Line adaptive operation of the first, second and third switching circuits 410, 420', 430 of the power converter 1600 can be achieved along the lines of the AC-powered operations described above with reference to FIG. 4 and in the aforementioned U.S. patent application Ser. No. 09/374, 180. For example, when the AC input voltage $V_{AC}$ provided by the AC power source 10 is at or near a nominal level (e.g., the desired level for the AC output voltage $V_{out}$), the first and second switches 411, 412 of the first switching circuit 410 can be complementarily opened and closed for alternating half cycles, such that the voltages $V_1$, $V_2$ on the first and second voltage busses 402a, 402b essentially track the AC input voltage $V_{AC}$ for respective positive and negative half cycles. The third and fourth switches 421, 422 of the second switching circuit 420' can be operated in a similar manner, connecting the load 20 to alternating ones of the first and second voltage busses 402a, 402b through the inductor $L_{2a}$ to produce successive half cycles of the AC output voltage $V_{out}$. The third switching circuit 430 (or "balancer") is preferably operated such that the fifth switch 431 is closed when the AC input voltage $V_{AC}$ is negative and the sixth switch 432 is closed when the AC input voltage $V_{AC}$ is positive. However, it will be understood that operation of the third switching circuit 430 can be varied to change the relative magnitudes of the voltages $V_1$, $V_2$ that are produced on the first and second voltage busses 402a, 402b.

If the AC input voltage $V_{AC}$ is greater than the desired output voltage $V_{out}$, the operation of the switches of the first and third switching circuits 410, 430 remains the same, but the operation of the second switching circuit 420' can be changed such that it bucks the AC output voltage $V_{out}$ with respect to the voltages $V_1$, $V_2$ on the first and second voltage busses 402a, 402b and maintains the AC output voltage $V_{out}$ at a desired level. If the AC input voltage $V_{AC}$ is lower than the desired level for the output voltage $V_{out}$, the second and third switching circuits 420', 430 can be operated as under the nominal conditions described above, while the first switching circuit 410 is controlled such that the voltages $V_1$, $V_2$ on the first and second voltage busses 402a, 402b are boosted with respect to the AC input voltage $V_{AC}$, maintaining the AC output voltage $V_{AC}$ at the desired level. During these AC-powered operations, the ninth and tenth switches 451, 452 of the power converter circuit 450 preferably remain open, such that the freewheeling diodes $D_3$, $D_4$ rectify the AC output voltage $V_{out}$ and "peak charge" the storage capacitors $C_3$, $C_4$, i.e., the first and second storage busses 455a, 455b are charged to respective positive and negative voltages at or near the respective positive and negative peak voltages of the AC output voltage $V_{out}$.

The power converter 1600 can be transitioned between an AC-powered mode and a DC-powered mode by operating the seventh switch 441 such that the first inductor $L_1$ is decoupled from the AC power source 10 and coupled to the negative terminal of the DC power source 12. This transition may be made responsive to sensing a reduction of the AC input voltage $V_{AC}$ produced by the AC power source 10 or other fault condition. During transitioning of the seventh switch 441, the power converter 1600 may experience a momentary reduction or other degradation of the AC output voltage $V_{out}$ produced by the converter 1600.

Although such a degradation may be acceptable in some applications, it may cause problems, such as loss of data or other information, in other applications. According to an aspect of the present invention, this degradation can be reduced through appropriate operation of the storage circuit 450. When a. fault in the AC input voltage $V_{AC}$ occurs, the converter 1600 can transition the seventh switch 441 from connecting the first inductor $L_1$ to the AC power source 10 to connecting the first inductor $L_1$ to the negative terminal of the DC power source 12. Concurrently, the converter 1600 can selectively operate the ninth and tenth switches 451, 452 such that at least one of the first and second storage busses 455a, 455b is coupled to the load 20 through the inductor $L_{2b}$ and provides power to the load 20. It will be appreciated that the particular one of the first and second storage busses 455a, 455b coupled to the load 20 may depend on whether the AC output voltage $V_{out}$ is currently in a positive or a negative half cycle, as well on the magnitude of the AC output voltage $V_{out}$. For example, if transitioning of the seventh switch 441 requires more than one half cycle, the ninth and tenth switches 451, 452 may be operated in an alternating fashion to synthesize the desired AC output voltage $V_{AC}$. In addition, the ninth and tenth switches 451, 452 may be modulated to regulate the magnitude of the AC output voltage $V_{AC}$.

Online Operation

In an inline mode, the first switching circuit 410 of the converter 1600 can be operated as a current source, with the first and second switches 411, 412 being pulse width modulated (PWM) such that the AC input current $I_{AC}$ has a desired waveform. The fifth and sixth switches 431, 432 in the third switching circuit 430 (acting as a "balancer") can be operated at or near complementary 50% duty cycles, such that the voltages $V_1$, $V_2$ at the first and second voltage busses 402a, 402b are constrained to have approximately equal magnitude. The second switching circuit 420' can be operated as an inverter, producing the AC output voltage $V_{out}$ from the voltages $V_1$, $V_2$.

If the instantaneous current delivered to the load 20 by the second switching circuit is sufficiently high such that the constrained current draw from the AC source by the first switching circuit 410 and the stored energy available in the capacitors $C_1$, $C_2$ is unable to meet the instantaneous demand, the voltages $V_1$, $V_2$ at the first and second voltage busses 402a, 402b could significantly vary, resulting in difficulty in supplying a desired output voltage $V_{out}$.

Under such conditions, the storage circuit 450 can supply the needed additional energy needed to maintain the AC output voltage $V_{out}$. The ninth and tenth switches 451, 452 in the storage circuit 450 can be operated in synchronism with the third and fourth switches 421, 422 in the second switching circuit 420', i.e., such that the ninth switch 451 opens and closes in sync with the third switch 421 and the tenth switch 452 opens and closes in sync with the fourth switch 422. In particular, when the third switch 421 and the ninth switch 451 are conducting, current can flow to the load 20 from either the first voltage bus 402a or the first storage bus 455a to equalize the voltage $V_1$ at the first voltage bus 402a and the voltage $V_{S1}$ at the first storage bus 455a. Similarly, when the fourth switch 422 and the tenth switch 452 are conducting, current can flow to the load 20 from either the second voltage bus 402b or the second storage bus 455b to equalize the voltage $V_2$ at the second voltage bus 402b and the voltage $V_{S2}$ at the second storage bus 455b. This can decouple current flowing to the load 20 froth the current $I_{AC}$ drawn from the AC power source 10. Thus, for example, even if the load 20 is a nonlinear load that exhibits a pulsed current demand centered at the peaks of the AC output voltage $V_{out}$, the converter 1600 can be constrained to draw a near sinusoidal (or quasi-sinusoidal) current from the AC power source 10, as the storage capacitors $C_3$, $C_4$ of the storage circuit 450 meet excess current demand of the load 20 during the current demand pulses and recharge during those portions of the AC output voltage $V_{out}$ waveform when there is reduced current demand from the load 20. Preferably, in such an online mode, the first, second, and third switching circuits 410, 420', 430 and the storage circuit 450 are operated such that the converter 1600 draws a near sinusoidal or quasi-sinusoidal current $I_{AC}$ from the AC power source 10 that is substantially in phase with the AC input voltage $V_{AC}$, thus operating the converter 1600 at or near unity power factor. However, it will be appreciated that the converter 1600 can be operated such that other AC input current $I_{AC}$ waveforms are produced.

Other variations are also possible within the scope of the present invention. For example, to reduce inrush current from the output terminal 403 to the storage capacitors $C_3$, $C_4$ when the second switching circuit 420' first acts to produce the AC output voltage $V_{out}$, the storage capacitors $C_3$, $C_4$ can be precharged by connecting the first voltage bus 402a to the first storage bus 455a with a series combination of a diode and resistor (not shown) and connecting the second voltage bus 402b to the second storage bus 455b with a series combination of a diode and a resistor (not shown). Once the storage capacitors $C_3$, $C_4$ have charged (with the third, fourth, ninth and tenth switches 421, 422, 451, 452 "off"), "line adaptive" or "online" operations of the converter 1600 can proceed as described above.

DC-Powered Operation

The converter 1600 can be operated in a DC powered mode in which reference for the negative terminal of the DC power source 12 is moved between the neutral bus N and the second voltage bus 402b, similar to the operations described with reference to FIGS. 6–12. Alternatively, the first switching circuit 410 can be operated in a boost mode to provide positive and negative DC voltages $V_1$, $V_2$ at the first and second voltage busses 402a, 402b. Concurrently, the second switching circuit 420' and the ninth and tenth switches 451, 452 of the storage circuit being can be operated in synchronism, producing a desired AC output voltage $V_{out}$ waveform at the output terminal 403 in a manner similar to the on line AC operations described above.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A power converter, comprising:

first and second voltage busses;

a first input port having first and second terminals, the first terminal coupled to one of the first and second voltage busses;

a neutral bus;

an output terminal;

a first switching circuit operative to selectively couple the second terminal of the first input port to the first and second voltage busses;

a second switching circuit operative to selectively couple the first and second voltage busses to the output terminal; and a third switching circuit operative to selectively couple the first and second voltage busses to the neutral bus.

2. A power converter according to claim 1, wherein the first, second and third switching circuits are operative to produce an AC output voltage at the output terminal from a DC input voltage at the first input port such that alternating ones of the first and second terminals of the first input port are referenced to the neutral bus for successive first and second half cycles of the AC output voltage.

3. A power converter according to claim 2, wherein the first, second and third switching circuits are operative to produce the AC output voltage at the output terminal from a DC input voltage at the first input port such that:

at least one of the second switching circuit and the third switching circuit regulates the AC output voltage for a first portion of a first half cycle of the AC output voltage; and the first switching circuit regulates the AC output voltage for a second portion of the first half cycle of the AC output voltage.

4. A power converter according to claim 3:

wherein the first portion of the first half cycle of the AC output voltage comprise a portion of the first half cycle of the AC output voltage for which the magnitude of the AC output voltage is less than the magnitude of the DC input voltage; and wherein the second portion of the first half cycle of the AC output voltage comprises a portion of the first half cycle of the AC output voltage for which the magnitude of the AC output voltage is greater than the magnitude of the DC input voltage.

5. A power converter according to claim 3, wherein the first half cycle comprises a positive half-cycle of the AC output voltage, and wherein the first, second and third switching circuits are further operative to produce the AC output voltage at the output terminal from the DC input voltage at the first input port such that:

at least one of the second switching circuit and the third switching circuit regulates the AC output voltage for a first portion of a negative second half cycle of the AC output voltage; and the first switching circuit regulates the AC output voltage for a second portion of the negative second half cycle of the AC output voltage.

6. A power converter according to claim 5:

wherein the first portion of the negative second half cycle of the AC output voltage comprises a portion of the negative second half cycle of the AC output voltage for which the magnitude of the AC output voltage is less than the magnitude of the DC input voltage; and wherein the second portion of the negative second half cycle of the AC output voltage comprises a portion of the second half cycle of the AC output voltage for which the magnitude of the AC output voltage is greater than the magnitude of the DC input voltage.

7. A power converter, comprising:

first and second voltage busses;

a first input port having first and second terminals, the first terminal coupled to one of the first and second voltage busses;

a neutral bus;

an output terminal;

a first switching circuit operative to selectively couple the second terminal of the first input port to the first and second voltage busses, wherein the first switching circuit comprises:
  a first inductance having first and second terminals, the first terminal of the first inductance coupled to the second terminal of the first input port;
  a first switch operative to couple and decouple the second terminal of the first inductance and the first voltage bus; and
  a second switch operative to couple and decouple the second terminal of the first inductance and the second voltage bus;

a second switching circuit operative to selectively couple the first and second voltage busses to the output terminal, wherein the second switching circuit comprises:
  a second inductance having first and second terminals, the first terminal of the second inductance coupled to the output terminal;
  a third switch operative to couple and decouple the second terminal of the second inductance and the first voltage bus; and
  a fourth switch operative to couple and decouple the second terminal of the second inductance and the second voltage bus; and a third switching circuit operative to selectively couple the first and second voltage busses to the neutral bus, wherein the third switching circuit comprises:
  a third inductance having first and second terminals, the first terminal of the third inductance connected to the neutral bus;
  a fifth switch operative to couple and decouple the second terminal of the third inductance and the first voltage bus; and
  a sixth switch operative to couple and decouple the second terminal of the third inductance and the second voltage bus.

8. A power converter according to claim 7, wherein the first and second switches operate in a substantially complementary fashion, wherein the third and fourth switches operate in a substantially complementary fashion, and wherein the fifth and sixth switches operate in a substantially complementary fashion.

9. A power converter according to claim 7, further comprising a seventh switch operative to couple and decouple the first terminal of the first inductance to the second terminal of the first input port.

10. A power converter according to claim 9, further comprising a battery connected to the first and second terminals of the first input port.

11. A power converter, comprising:

first and second voltage busses;

a first input port having first and second terminals, the first terminal coupled to one of the first and second voltage busses;

a neutral bus;

an output terminal;

a first switching circuit operative to selectively couple the second terminal of the first input port to the first and second voltage busses;

a second switching circuit operative to selectively couple the first and second voltage busses to the output terminal;

a third switching circuit operative to selectively couple the first and second voltage busses to the neutral bus;

a second input port; and a fourth switching circuit operative to:
concurrently couple the second terminal of the first input port to the second voltage bus, decouple the second terminal of the first input port from the first switching circuit, and couple the first switching circuit to a first terminal of the second input port, in a first mode; and
concurrently couple the second terminal of the first input port to the first switching circuit, decouple the second terminal of the first input port from the second voltage bus, and decouple the first terminal of the second input port from the first switching circuit, in a second mode.

12. A power converter according to claim 11, wherein the first, second and third switching circuits are operative to generate a DC voltage across the first and second voltage busses from an AC voltage at the second input port.

13. A power converter according to claim 12, wherein the first, second and third switches are operative to generate a DC voltage across the first and second voltage busses in the first mode that is sufficient to cause power to be transferred from the first and second voltage busses to the first input port.

14. A power converter according to claim 1, further comprising a storage circuit coupled to the output terminal, the storage circuit including:
a capacitive storage element;
a rectifying circuit that rectifyingly couples the capacitive storage element to the output terminal to produce a DC voltage across the capacitive storage element from an AC output voltage at the output terminal; and
a fourth switching circuit that selectively couples the capacitive storage element to the output terminal.

15. A power converter according to claim 14:
wherein the storage circuit comprises first and second storage busses;
wherein the capacitive storage element comprises respective first and second capacitors coupling respective ones of the first and second storage busses to the neutral bus; and
wherein the fourth switching circuit comprises:
a first switch operative to couple and decouple the first storage bus and the output terminal; and
a second switch operative to couple and decouple the second storage bus and the output terminal.

16. A power converter, comprising:
first and second voltage busses;
an output terminal;
a DC voltage generating circuit operative to produce respective first and second DC voltages on respective ones of the first and second voltage busses;
a first switching circuit operative to selectively couple the first and second voltage busses to the output terminal; and
a storage circuit connected to the output terminal, the storage circuit including:
a capacitive storage element;
a rectifying circuit coupling the capacitive storage element to the output terminal and operative to produce a DC voltage across the capacitive storage element from an AC output voltage at the output terminal; and
a second switching circuit operative to selectively couple the capacitive storage element to the output terminal.

17. A power converter according to claim 16:
wherein the first switching circuit comprises:
a first inductor having first and second terminals, the first terminal coupled to the output terminal; and
respective first and second switches operative to selectively couple the second terminal of the inductor to the first and second voltage busses;
wherein the power converter further comprises a second inductor that electrically couples the storage circuit to the output terminal and that is inductively coupled to the first inductor.

18. A power converter according to claim 17, wherein the first and second inductors comprise respective first and second windings wound on a common core.

19. A power converter according to claim 17, wherein the first and second switching circuits operate in synchronism.

20. A power converter according to claim 17:
wherein the DC voltage generating circuit is configured to receive an AC input voltage with respect to a neutral bus and to generate the first and second DC voltages on the first and second voltage busses therefrom;
wherein the storage circuit comprises first and second storage busses;
wherein the capacitive storage element comprises respective first and second capacitors coupling respective ones of the first and second storage busses to the neutral bus; and
wherein the second switching circuit comprises:
a third switch operative to couple and decouple the first storage bus and the output terminal; and
a fourth switch operative to couple and decouple the second storage bus and the output terminal.

21. A power converter according to claim 20, wherein the first and third switches open and close in synchronism, and wherein the second and fourth switches open and close in synchronism.

22. A power converter according to claim 16, wherein the DC voltage generating circuit is operative to produce the first and second DC voltages on the first and second voltage busses from at least one of an AC input voltage and a DC input voltage applied to the DC voltage generating circuit.

23. A power converter according to claim 22, wherein the DC voltage generating circuit comprises a rectifying circuit configured to connect to an AC power source at an AC input port and operative to produce the first and second DC voltages on the first and second voltage busses from an AC input voltage applied to the DC voltage generating circuit, and wherein the rectifying circuit, the first switching circuit and the second switching circuit are operative to produce the AC output voltage at the output terminal while maintaining a substantially unity power factor at the AC input port.

24. A method of generating an AC output voltage at a load from a DC input voltage produced by a DC power source, the method comprising the steps of:
coupling a first terminal of the DC power source to one of a first voltage bus and a second voltage bus;
selectively coupling a second terminal of the DC power source to the first voltage bus and a second voltage bus;
coupling a first terminal of a load to a neutral bus;
selectively coupling the first and second voltage busses to a second terminal of the load; and
selectively coupling the first and second voltage busses to the neutral bus.

25. A method according to claim 24:
wherein said step of selectively coupling a second terminal of the DC power source to the first voltage bus and a second voltage bus comprises the step of selectively coupling respective ones of the first and second voltage busses to the DC power source through respective first and second switches;

wherein said step of selectively coupling the first and second voltage busses to a second terminal of the load comprises the step of selectively coupling respective ones of the first and second voltage busses to the second terminal of the load through respective third and fourth switches; and wherein said step of selectively coupling the first and second voltage busses to the neutral bus comprises the step of selectively coupling respective ones of the first and second voltage busses to the neutral bus through respective fifth and sixth switches.

26. A method according to claim 24, comprising the step of alternatingly referencing the first and second terminals of the DC power source to the neutral bus for successive first and second half cycles of the AC output voltage.

27. A method according to claim 24, further comprising the steps of:

selectively coupling the first and second voltage busses to at least one of the second terminal of the load and the neutral bus to regulate the AC output voltage for a first portion of a first half cycle of the AC output voltage for which the magnitude of the AC output voltage is less than the magnitude of the DC input voltage; and selectively coupling the first and second voltage busses to the second terminal of the DC power source to regulate the AC output voltage for a second portion of the first half cycle of the AC output voltage for which the magnitude of the AC output voltage is greater than the magnitude of the DC input voltage.

28. A method according to claim 25, further comprising the steps of:

selectively coupling the first and second voltage busses to the second terminal of the load through the third and fourth switches or to the neutral bus through the fifth and sixth switches to regulate the AC output voltage for a first portion of a first half cycle of the AC output voltage for which the magnitude of the AC output voltage is less than the magnitude of the DC input voltage; and selectively coupling the first and second voltage busses to the second terminal of the DC power source through the first and second switches to regulate the AC output voltage for a second portion of the first half cycle of the AC output voltage for which the magnitude of the AC output voltage is greater than the magnitude of the DC input voltage.

29. A method according to claim 27, wherein the first half cycle of the AC output voltage comprises a positive first half-cycle of the AC output voltage, and wherein the method further comprise the steps of:

selectively coupling the first and second voltage busses to at least one of the second terminal of the load and the neutral bus to regulate the AC output voltage for a first portion of a negative second half cycle of the AC output voltage for which the magnitude of the AC output voltage is less than the magnitude of the DC input voltage; and selectively coupling the first and second voltage busses to the second terminal of the DC power source to regulate the AC output voltage for a second portion of the negative second half cycle of the AC output voltage for which the magnitude of the AC output voltage is greater than the magnitude of the DC input voltage.

30. A method according to claim 28, wherein the first half-cycle of the AC output voltage comprises a positive first half cycle of the AC output voltage, and wherein the method further comprises the steps of:

selectively coupling the first and second voltage busses to the second terminal of the load through the third and fourth switches or to the neutral bus through the fifth and sixth switches to regulate the AC output voltage for a first portion of a negative second half cycle of the AC output voltage for which the magnitude of the AC output voltage is less than the magnitude of the DC input voltage; and selectively coupling the first and second voltage busses to the second terminal of the DC power source through the first and second switches to regulate the AC output voltage for a second portion of the negative second half cycle of the AC output voltage for which the magnitude of the AC output voltage is greater than the magnitude of the DC input voltage.

31. A method according to claim 24, wherein the DC power source is a battery.

32. A method according to claim 24, further comprising the steps of:

rectifyingly coupling a capacitive storage element to the second terminal of the load to produce a DC voltage across the capacitive storage element from the AC output voltage at the second terminal of the load; and selectively coupling the capacitive storage element to the second terminal of the load through a switching circuit to transfer power between the capacitive storage element to the load.

33. A method of producing an AC output voltage at a load, the method comprising the steps of:

generating respective first and second DC voltages on the first and second voltage busses;

selectively coupling the first and second voltage busses to the load through respective first and second switches to generate an AC output voltage at the load;

rectifyingly coupling first and second capacitors to the load to produce respective first and second DC voltages across respective ones of the first and second capacitors from an AC output voltage at the load; and selectively coupling the first and second capacitors to the load through respective third and fourth switches to transfer power between the first and second capacitors and the load.

34. A method according to claim 33:

wherein the step of selectively coupling the first and second voltage busses to the load comprises the step of selectively coupling the first and second voltage busses to the load through a first inductor;

wherein the step of rectifyingly coupling comprises the step of rectifyingly coupling the first and second capacitors to the load through a second inductor; and wherein the step of selectively coupling the first and second capacitors to the load comprises the step of selectively coupling the first and second capacitors to the load through the second inductor; and wherein the method further comprises the step of inductively coupling the first and second inductors.

35. A method according to claim 34, wherein the first and second inductors comprise respective first and second windings wound on a common core.

36. A method according to claim 34, comprising the steps of:

operating the first and third switches in synchronism; and operating the second and fourth switches in synchronism.

37. A method according to claim 33, wherein the step of generating respective first and second DC voltages comprises the step of rectifying an AC input voltage applied at an input port to produce the first and second DC voltages while maintaining a substantially unity power factor at the input port, and wherein the method comprises the step of operating the first, second, third and fourth switches to produce the AC output voltage at the load.

* * * * *

UNITED STATES PATENT AND TRADEMARK OFFICE
CERTIFICATE OF CORRECTION

PATENT NO.    : 6,483,730 B2
DATED         : November 19, 2002
INVENTOR(S)   : Johnson, Jr.

It is certified that error appears in the above-identified patent and that said Letters Patent is hereby corrected as shown below:

<u>Column 8,</u>
Line 50, please begin a new line with "Referring again to FIG. 4, AC."

<u>Column 9,</u>
Line 49, please delete "20".

Signed and Sealed this

Twenty-fifth Day of May, 2004

JON W. DUDAS
*Acting Director of the United States Patent and Trademark Office*